US012777482B2

(12) United States Patent
Wang

(10) Patent No.: US 12,777,482 B2
(45) Date of Patent: Oct. 27, 2026

(54) MONITORING METHOD AND TERMINAL

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 431 days.

(21) Appl. No.: 18/552,967

(22) PCT Filed: Mar. 31, 2022

(86) PCT No.: PCT/CN2022/084534
§ 371 (c)(1),
(2) Date: Sep. 28, 2023

(87) PCT Pub. No.: WO2022/206914
PCT Pub. Date: Oct. 6, 2022

(65) Prior Publication Data

US 2024/0196399 A1 Jun. 13, 2024

(30) Foreign Application Priority Data

Apr. 1, 2021 (CN) ......................... 202110358669.8

(51) Int. Cl.
*H04W 72/1273* (2023.01)
*H04B 7/06* (2006.01)
(Continued)

(52) U.S. Cl.
CPC .... *H04W 72/1273* (2013.01); *H04B 7/06968* (2023.05); *H04W 72/0457* (2023.01); *H04W 76/20* (2018.02)

(58) Field of Classification Search
CPC ......... H04W 72/1273; H04W 72/0457; H04W 76/20; H04W 72/0453; H04B 7/06968; H04L 5/001; H04L 5/0053; H04L 5/0094
See application file for complete search history.

(56) References Cited

U.S. PATENT DOCUMENTS 12,177,781 B2 * 12/2024 Wu ....................... H04L 5/0048
2020/0100239 A1 * 3/2020 Jassal .................... H04L 5/0094
(Continued)

FOREIGN PATENT DOCUMENTS

CN 111082912 A 4/2020
CN 111148239 A 5/2020
(Continued)

OTHER PUBLICATIONS

WIPO, International Search Report and Written Opinion for International Application No. PCT/CN2022/084534, Jun. 27, 2022.
(Continued)

*Primary Examiner* — Harry H Kim
(74) *Attorney, Agent, or Firm* — JCIPRNET

(57) ABSTRACT

A monitoring method and apparatus, a terminal, and a network device are provided. The method includes the following. If M control resource sets (CORESETs) associated with two transmission configuration indication (TCI) states and N CORESETs associated with one TCI state exist in CORESETs associated with physical downlink control channel (PDCCH) candidates monitored in overlapping PDCCH monitoring occasions on an active downlink bandwidth part (BWP), a terminal performs PDCCH monitoring in the M CORESETs associated with two TCI states and/or the N CORESETs associated with one TCI state, where M is an integer and M≥1, and N is an integer and N≥0.

13 Claims, 3 Drawing Sheets

(51) Int. Cl.

| | |
|---|---|
| ***H04L 5/00*** | (2006.01) |
| ***H04W 72/0453*** | (2023.01) |
| ***H04W 72/0457*** | (2023.01) |
| ***H04W 76/20*** | (2018.01) |

(56) References Cited

U.S. PATENT DOCUMENTS

| | | | | |
|---|---|---|---|---|
| 2022/0046541 | A1* | 2/2022 | Wu | H04L 5/0048 |
| 2022/0053522 | A1* | 2/2022 | MolavianJazi | H04L 1/1819 |
| 2023/0048114 | A1* | 2/2023 | Wu | H04B 7/06968 |
| 2023/0217460 | A1* | 7/2023 | Zhang | H04B 7/06952 370/329 |
| 2024/0205711 | A1* | 6/2024 | Seo | H04L 5/0048 |
| 2024/0284467 | A1* | 8/2024 | Mondal | H04B 7/0874 |
| 2025/0070942 | A1* | 2/2025 | Cirik | H04B 7/06966 |
| 2025/0106859 | A1* | 3/2025 | Cirik | H04B 7/06956 |
| 2025/0142569 | A1* | 5/2025 | MolavianJazi | H04W 72/20 |
| 2025/0151030 | A1* | 5/2025 | Chen | H04W 72/1273 |

FOREIGN PATENT DOCUMENTS

| | | |
|---|---|---|
| CN | 111278092 A | 6/2020 |
| CN | 112335305 A | 2/2021 |
| CN | 112533235 | 3/2021 |
| IN | 201937047863 | 2/2021 |
| WO | 2019214671 A1 | 11/2019 |
| WO | 2021011442 | 1/2021 |

OTHER PUBLICATIONS

Ericsson "Correction to paging PDCCH monitoring slot index" 3GPP TSG RAN WG1 Meeting #95 R1-1813122, dated Nov. 12-16, 2018.

First Office Action issued in corresponding CN application No. 202110358669.8 dated Apr. 1, 2025.

Second Office Action issued in corresponding CN application No. 202110358669.8 dated Oct. 15, 2025.

Nokia et al., "On TCI state indication for SCells at Direct SCell activation", 3GPP TSG-RAN WG2 Meeting #113 Electronic, R2-2101075, Jan. 25, 2021-Feb. 5, 2021, pp. 1-4.

"Notice on Grant of Patent Right for Invention of China Counterpart Application", issued on Mar. 24, 2026, with English translation thereof, p. 1-p. 8.

* cited by examiner

MONITORING METHOD AND TERMINAL

CROSS-REFERENCE TO RELATED APPLICATION(S)

This application is a National Stage of International Application No. PCT/CN2022/084534, field Mar. 31, 2022, which claims priority to Chinese Patent Application No. 202110358669.8, filed Apr. 1, 2021, the entire disclosures of which are hereby incorporated by reference.

TECHNICAL FIELD

The disclosure relates to the field of communication technology, and more particularly, to a monitoring method and apparatus, a terminal, and a network device.

BACKGROUND

The $5^{th}$ generation new radio (5G NR) protocol formulated by the $3^{rd}$ generation partnership project (3GPP) has the following contents: in overlapping physical downlink control channel (PDCCH) monitoring occasions on an active downlink bandwidth part (BWP), if multiple control resource sets (CORESETs) associated with PDCCH candidates have different quasi co-location (QCL)-type D properties, a terminal is required to perform PDCCH monitoring according to a priority rule.

However, it is generally assumed in the existing 5G NR protocol that the terminal can support only a CORESET configured with one transmission configuration indication (TCI) state, and can monitor only a PDCCH associated with one QCL-typeD property. Therefore, if the terminal can support a CORESET configured with two TCI states, how to implement PDCCH monitoring needs to be further studied.

SUMMARY

In a first aspect, a monitoring method is provided in embodiments of the disclosure. The method includes the following. If M CORESETs associated with two TCI states and N CORESETs associated with one TCI state exist in CORESETs associated with PDCCH candidates monitored in overlapping PDCCH monitoring occasions on an active downlink bandwidth part (BWP), a terminal performs PDCCH monitoring in the M CORESETs associated with two TCI states and/or the N CORESETs associated with one TCI state, where M is an integer and M≥1, and N is an integer and N≥0.

In a second aspect, a terminal is provided in embodiments of the disclosure. The apparatus includes a processing unit. The terminal includes a processor, a memory, a communication interface, and one or more programs. The one or more programs are stored in the memory and configured to be executed by the processor, and the one or more programs include instructions for implementing steps in the first aspect of embodiments of the disclosure.

In a third aspect, a non-transitory computer-readable storage medium is provided in embodiments of the disclosure. The non-transitory computer-readable storage medium is configured to store computer programs for electronic data interchange (EDI), where the computer programs are operable with a computer to implement some or all of the steps described in the first aspect or the second aspect of embodiments of the disclosure.

BRIEF DESCRIPTION OF THE DRAWINGS

In order to describe more clearly technical solutions of embodiments of the disclosure, the following will give a brief introduction to the accompanying drawings used for describing embodiments or the related art. Apparently, the accompanying drawings described below are merely some embodiments of the disclosure. Based on these drawings, those of ordinary skill in the art can also obtain other drawings without creative effort.

DETAILED DESCRIPTION

Figure 1:
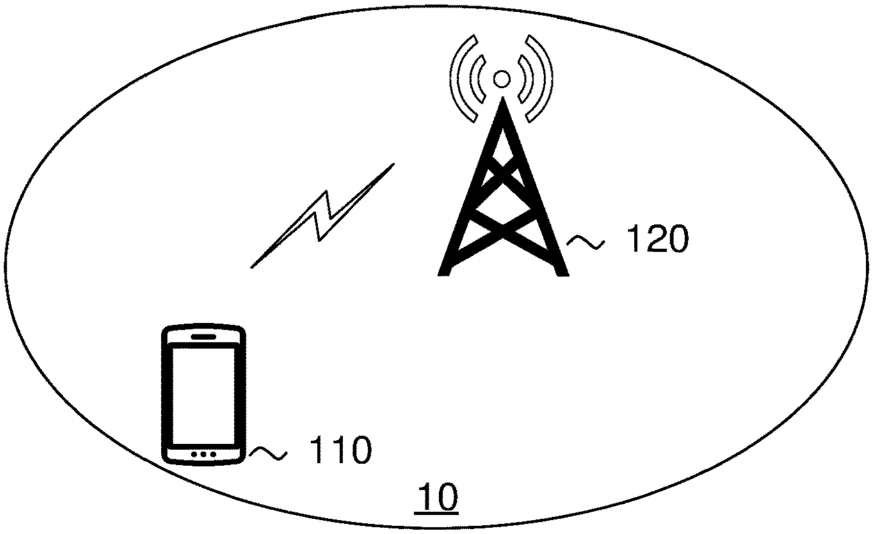
FIG. 1 is a schematic architectural diagram of a wireless communication system provided in embodiments of the disclosure.

In order for those skilled in the art to better understand the technical solutions of the disclosure, the following will describe in detail the technical solutions of embodiments of the disclosure with reference to the accompanying drawings in the embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The terms "first", "second", etc. in the specification and claims of the disclosure and in the accompanying drawings are intended for distinguishing different objects rather than describing a particular order. In addition, the terms "include", "comprise", and "have" as well as variations thereof are intended to cover non-exclusive inclusion. For example, a process, method, software, product, or device including a series of steps or units is not limited to the listed steps or units, instead, it may optionally include other steps or units that are not listed, or may optionally include other steps or units inherent to the process, method, product, or device.

The term "embodiment" referred to herein means that a particular feature, structure, or characteristic described in conjunction with the embodiment may be contained in at least one embodiment of the disclosure. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

It should be noted that, the term "connection" in embodiments of the disclosure refers to various connection modes such as direct connection or indirect connection, so as to implement communication between devices, and the disclosure is not limited in this regard. The terms "network" and "system" in embodiments of the disclosure refer to the same concept, and a communication system refers to a communication network.

The technical solutions of embodiments of the disclosure can be applied to various wireless communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a $6^{th}$-generation (6G) system, or other communication systems, etc.

It should be noted that, a conventional wireless communication system supports a limited quantity of connections and therefore is easy to implement. However, with development of communication technology, a wireless communication system will not only support a conventional wireless communication system but also support, for example, device to device (D2D) communication, machine to machine (M2M) communication, machine type communication (MTC), vehicle to vehicle (V2V) communication, vehicle to everything (V2X) communication, narrow band internet of things (NB-IoT) communication, etc. Therefore, technical solutions of embodiments of the disclosure can also be applied to these wireless communication systems.

Optionally, the wireless communication system in embodiments of the disclosure can be applied to a beamforming scenario, a carrier aggregation (CA) scenario, a dual connectivity (DC) scenario, or a standalone (SA) deployment scenario, etc.

Optionally, the wireless communication system in embodiments of the disclosure can be applied to an unlicensed spectrum, where the unlicensed spectrum may be considered as a shared spectrum. Alternatively, the wireless communication system in embodiments may be applied to a licensed spectrum, where the licensed spectrum may be considered as a non-shared spectrum.

Since various embodiments may be described in conjunction with a terminal and a network device in embodiments of the disclosure, a terminal and a network device involved will be described in detail below.

Specifically, the terminal may be a user equipment (UE), a remote terminal (remote UE), a relay device (relay UE), an access terminal, a subscriber unit, a subscriber station, a mobile station, a remote station, a mobile device, a user terminal, a smart terminal, a wireless communication device, a user agent, or a user device. It should be noted that, the relay device is a terminal capable of providing relay forwarding services for other terminals (including a remote terminal). In addition, the terminal may also be a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR communication system, or a terminal device in a future evolved public land mobile network (PLMN), etc., and the disclosure is not limited in this regard.

In addition, the terminal may be deployed on land, which includes indoor or outdoor, handheld, wearable, or in-vehicle. The terminal may also be deployed on water (such as ships, etc.). The terminal may also be deployed in the air (such as airplanes, balloons, satellites, etc.).

In addition, the terminal may be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

In addition, the terminal may include an apparatus having a transceiver function, such as a system-on-chip (SOC). The SOC may include a chip, and may further include other discrete devices.

Specifically, the network device may be a device for communicating with a terminal, and is responsible for radio resource management (RRM) at an air-interface side, quality of service (QoS) management, data compression and encryption, data transmission and reception, etc. The network device may be a base station (BS) in a communication system or a device deployed on a radio access network (RAN) and used for providing wireless communication functions, for example, a base transceiver station (BTS) in a GSM or CDMA communication system, a node B (NB) in a WCDMA communication system, and an evolutional node B (eNB or eNodeB) in an LTE communication system, a next-generation evolved node B (ng-eNB) in an NR communication system, and a next-generation node B (gNB) in an NR communication system, a master node (MN) in a DC architecture, a secondary node (SN) in a DC architecture, and the like, and the disclosure is not limited in this regard.

In addition, the network device may also be other devices in a core network (CN), such as an access and mobility management function (AMF) and a user plane function (UPF), or may be an access point (AP) in a WLAN, a relay station, a communication device in a future evolved PLMN, a communication device in an NTN, and the like.

In addition, the network device may include an apparatus, such as an SOC, that can provide wireless communication functions for the terminal. For example, the SOC may include a chip, and may further include other discrete devices.

In addition, the network device may communicate with an Internet protocol (IP) network, for example, the Internet, a private IP network, or other data networks.

It should be noted that, in some network deployments, a network device may be an independent node so as to implement all functions of the base station, and may include a centralized unit (CU) and a distributed unit (DU), such as a gNB-CU and a gNB-DU. The network device may further include an active antenna unit (AAU). The CU can implement some functions of the network device, and the DU can also implement some other functions of the network device. For example, the CU is responsible for processing non-real-time protocols and services, and implements functions of a radio resource control (RRC) layer and functions of a packet data convergence protocol (PDCP) layer. The DU is responsible for processing physical (PHY) layer protocols and real-time services, and implements functions of a radio link control (RLC) layer, functions of a media access control (MAC) layer, and functions of a PHY layer. In addition, the AAU can implement some PHY layer processing functions, radio frequency processing functions, and active-antenna related functions. Since RRC layer information will eventually become PHY layer information, or be transformed from PHY layer information, in such network deployment, it may be considered that higher layer signaling, such as RRC layer signaling, is transmitted by the DU, or transmitted by the DU and the AAU. It can be understood that, the network device may include at least one of the CU, the DU, or the AAU. In addition, the CU may be categorized into a network device in a RAN, or may be categorized into a network device in a CN, and the disclosure is not limited in this regard.

In addition, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In addition, the network device can serve a cell, and a terminal(s) in the cell can communicate with the network device over a transmission resource (for example, a spectrum resource). The cell may include a macro cell, a small cell, a metro cell, a micro cell, a pico cell, a femto cell, and the like.

With reference to the foregoing elaboration, the following will exemplify a wireless communication system according to embodiments of the disclosure.

Exemplarily, FIG. 1 illustrates a wireless communication system according to embodiments of the disclosure. The wireless communication system 10 may include a terminal 110 and a network device 120. The network device 120 may be a device for communicating with the terminal 110. In addition, the network device 120 may provide communication coverage for a specific geographical area, and may communicate with the terminal (s)110 within the coverage area.

Optionally, the wireless communication system 10 may include multiple network devices, and there may be certain quantities of terminals in a coverage area of each of the network devices. The disclosure is not limited in this regard.

Optionally, the wireless communication system 10 may further include other network entities such as a network controller, a mobile management entity, or the like, and the disclosure is not limited in this regard.

Optionally, the communication between the network device and the terminal in the wireless communication system 10 may be wireless communication or wired communication, and the disclosure is not limited in this regard.

Before describing in detail the monitoring method provided in embodiments of the disclosure, an introduction will be firstly given to the related art involved in embodiments of the disclosure.

1. Search Space and Control Resource Set (CORESET)

In a $5^{th}$ generation (5G) NR system, since a system bandwidth is large and terminals have different demodulation capabilities, in order to improve resource utilization and reduce complexity of blind detection, a physical downlink control channel (PDCCH) no longer has to occupy an entire frequency band in frequency domain. In addition, in order to improve flexibility of a system and adapt to different scenarios, a start position of the PDCCH in time domain is also configurable. Therefore, generally, in a 5G NR system, information such as a frequency band occupied by the PDCCH in frequency domain and the number (i.e. quantity) of orthogonal frequency-division multiplexing (OFDM) symbols occupied by the PDCCH in time domain is encapsulated in a CORESET, and information such as a start OFDM symbol for the PDCCH, a PDCCH monitoring periodicity, and a CORESET associated with the PDCCH is encapsulated in a search space.

The search space may include a common search space (CSS) and a UE-specific search space (USS).

It should be noted that, each search space is associated with one CORESET which is, for example, indicated or configured by a higher layer parameter controlResourceSetId, and each search space may be associated with multiple PDCCH candidates which are, for example, indicated or configured by a higher layer parameter nrofCandidates, and therefore, an association between multiple PDCCH candidates and CORESETs can be established by means of search space. In addition, since each CORESET may be associated with one, two, or more transmission configuration indication (TCI) states, in each PDCCH monitoring occasion, a CORESET associated with a PDCCH candidate may be configured with one, two, or more TCI states. On the other hand, since a higher layer may configure quasi colocation (QCL) by means of TCI state, a TCI state may be associated with QCL-typeD.

2. QCL

In order to ensure correct reception and demodulation of a signal, the concept of reference signals, such as channel state information reference signals (CSI-RSs) and synchronization signal blocks (SSBs), having a QCL relationship is introduced in a standard protocol, so that the terminal can estimate a large-scale parameter according to a CSI-RS. The large-scale parameter includes at least one of a delay spread, a Doppler spread, a Doppler shift, an average gain, an average delay, or spatial information, etc. For example, antenna port QCL is introduced in a standard protocol for an LTE communication system release 11. Antenna port QCL may indicate that signals transmitted from antenna ports may undergo the same large-scale fading and thus have the same large-scale parameter. For example, if antenna port A and antenna port B are in a QCL relationship, a large-scale parameter obtained through signal estimation on antenna port A is also applicable to a signal on antenna port B.

In addition, in a 5G NR system, the terminal and the network device may be configured with a large array of multiple antenna panels, and large-scale properties of beams formed by different antenna panels may also be different. In this case, in addition to the delay spread, the Doppler spread, the Doppler shift, the average gain, and the average delay described above, the large-scale parameter further includes an angle of arrival (AOA), an AOA spread, an angle of departure (AOD), an AOD spread, and a spatial correlation.

3. Antenna Port QCL

The terminal can be configured with up to M TCI states within a higher layer parameter PDSCH-Config, to decode a physical downlink shared channel (PDSCH) according to a detected PDCCH with downlink control information (DCI), where M depends on the capability of the terminal. Each TCL state contains a parameter for configuring a QCL relationship between one or two downlink reference signals (such as CSI-RS and/or SSB) and a demodulation reference signal (DM-RS) port of a PDSCH, a DM-RS port of a PDCCH, or a CSI-RS port of a CSI-RS resource. The QCL relationship can be configured by a higher layer parameter qcl-Type1 for a $1^{st}$ downlink reference signal and qcl-Type2 for a $2^{nd}$ downlink reference signal (if the $2^{nd}$ downlink reference signal is configured). For the case where there are two downlink reference signals, QCL types corresponding to the two downlink reference signals shall not be the same regardless of whether references are to the same reference signal. A QCL type corresponding to each downlink reference signal is given by a higher layer parameter qcl-Type in QCL-Info, and may include:

QCL-type A: {Doppler shift, Doppler spread, average delay, delay spread};

QCL-typeB: {Doppler shift, Doppler spread};

QCL-typeC: {Doppler shift, average delay};

QCL-typD: {spatial receive (Rx) parameter}; etc.

The spatial Rx parameter may include at least one of: an AOA, an average AOA, an AOA spread, an AOD, an average AOD, an AOD spread, an Rx antenna spatial correlation, a transmit antenna spatial correlation, a transmit beam, an Rx beam, a resource identity (ID), etc. In addition, if a QCL type is QCL-TypeD, a TCI state can indicate a beam. On the other hand, each TCI state may give (contain) one or two QCL type parameters. If a TCI state contains two QCL type parameters, the QCL type includes QCL-TypeD. In other words, a TCI state may be associated with QCL-typeD.

In addition, a TCI state may be activated by an activation command (such as a media access control-control element (MAC CE)) issued by a network side and indicated by a TCI field in DCI. For example, if the TCI state indicates a QCL type of a PDSCH, the network device may firstly activate $2^N$ TCI states via the MAC CE, and then indicate one TCI state from the $2^N$ activated TCI states via an N-bit TCI field in the DCI. If N=3 and the value of the TCI field in the DCI is "000", the TCI field indicates a 1st TCI state activated by the MAC CE. In addition, with respect to a QCL type parameter given by the indicated TCI state, a reference signal in the TCI state is quasi co-located with a DM-RS port of a PDSCH.

4. The Same QCL-typeD Property

How to determine whether QCL-typeD properties are the same may be as follows:

For the purpose of determining a control resource set (CORESET), an SSB is considered to have a different QCL-typeD property than a CSI-RS;

For the purpose of determining a CORESET, a first CSI-RS associated with an SSB in a first cell and a second CSI-RS in a second cell that is also associated with the SSB are assumed to have the same QCL-typeD property; etc.

For example, a reference signal of QCL-TypeD in a TCI state corresponding to CORESET #1 is the first CSI-RS, and a reference signal of QCL-TypeD in a TCI state corresponding to CORESET #2 is also the first CSI-RS, and accordingly, CORESET #1 and CORESET #2 have the same QCL-typeD property.

As can be seen, in overlapping PDCCH monitoring occasions on an active downlink bandwidth part (BWP), if multiple CORESETs associated with PDCCH candidates have different QCL-typeD properties, the terminal is required to perform PDCCH monitoring according to a priority rule. It is generally assumed in an existing 5G NR protocol that the terminal can support only a CORESET configured with one TCI state, and can monitor only a PDCCH associated with one QCL-typeD property. Therefore, if the terminal can support a CORESET configured with two TCI states, how to implement PDCCH monitoring needs to be further studied.

Embodiments of the disclosure provide a monitoring method and apparatus, a terminal, and a network device, so as to realize physical downlink control channel (PDCCH) monitoring in a control resource set (CORESET) associated with two transmission configuration indication (TCI) states and/or a CORESET associated with one TCI state when a terminal supports a CORESET configured with two TCI states, thereby ensuring flexibility, robustness, and stability of system communication.

Figure 2:
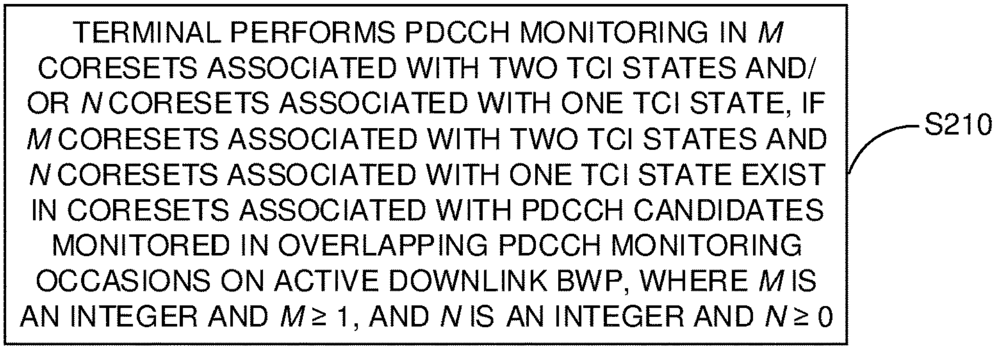
FIG. 2 is a schematic flowchart of a monitoring method provided in embodiments of the disclosure.

With reference to the above elaborations, embodiments of the disclosure provide a schematic flowchart of a monitoring method. Referring to FIG. 2, the method includes the following.

S210, if M CORESETs associated with two TCI states and N CORESETs associated with one TCI state exist in CORESETs associated with PDCCH candidates monitored in overlapping PDCCH monitoring occasions on an active downlink BWP, a terminal performs PDCCH monitoring in the M CORESETs associated with two TCI states and/or the N CORESETs associated with one TCI state, where M is an integer and M≥1, and N is an integer and N≥0.

It should be noted that, a network may configure one CORESET for each search space via a higher layer parameter (such as controlResourceSetId), that is, each search space may be associated with one CORESET. The network may also configure multiple PDCCH candidates for each search space via a higher layer parameter, that is, each search space may be associated with multiple PDCCH candidates. Therefore, an association between multiple PDCCH candidates and CORESETs can be established by means of search space, i.e. a CORESET is associated with at least one PDCCH candidate, or a PDCCH candidate is associated with a CORESET.

The terminal in embodiments of the disclosure supports a CORESET configured with two TCI states. Therefore, the CORESET configured for the terminal by a network may include the following three cases: only a CORESET associated with one TCI state; only a CORESET associated with two TCI states; and both a CORESET associated with one TCI state and a CORESET associated with two TCI states.

Since the M (M≥1) CORESETs associated with two TCI states and the N (N≥0) CORESETs associated with one TCI state exist in CORESETs associated with PDCCH candidates monitored in overlapping PDCCH monitoring occasions on an active downlink BWP, how to implement PDCCH monitoring needs to be further studied.

Based on the above illustration, embodiments of the disclosure are as follows: if the M CORESETs associated with two TCI states and the N CORESETs associated with one TCI state exist in CORESETs associated with PDCCH candidates monitored in overlapping PDCCH monitoring occasions on an active downlink BWP, PDCCH monitoring will be performed in the M CORESETs associated with two TCI states and/or the N CORESETs associated with one TCI state. In this way, it is possible for the terminal to realize PDCCH monitoring in a CORESET associated with two TCI states and/or a CORESET associated with one TCI state when the terminal supports a CORESET configured with two TCI states, thereby ensuring flexibility, robustness, and stability of system communication.

In addition, the terminal may perform PDCCH monitoring in the M CORESETs associated with two TCI states and/or the N CORESETs associated with one TCI state by means of the following three implementations.

The terminal performs PDCCH monitoring in the M CORESETs associated with two TCI states (case 1).

The terminal performs PDCCH monitoring in the M CORESETs associated with two TCI states and the N CORESETs associated with two TCI states (case 2).

The terminal performs PDCCH monitoring in the N CORESETs associated with one TCI state (case 3).

In embodiments of the disclosure, if N>0, PDCCH monitoring in case 3 may be performed based on an existing protocol standard, which will not be described in detail again herein. The following will elaborate case 1 and case 2 in the disclosure.

Case 1

In a possible example, the terminal may perform PDCCH monitoring in the M CORESETs associated with two TCI states and/or the N CORESETs associated with one TCI state as follows. The terminal performs PDCCH monitoring in a first reference CORESET and/or a CORESET associated with two TCI states and having the same QCL-typeD property as the first reference CORESET, where the first reference CORESET is one of the M CORESETs associated with two TCI states.

The CORESET associated with two TCI states and having the same QCL-typeD property as the first reference CORESET may include one or more of the M CORESETs associated with two TCI states and the N CORESETs associated with one TCI state.

It should be noted that, regarding case 1, it can be understood that the terminal only needs to perform PDCCH monitoring in a CORESET associated with two TCI states. The terminal may perform PDCCH monitoring according to the following three principles: perform PDCCH monitoring in the first reference CORESET; perform PDCCH monitoring in the first reference CORESET and the CORESET associated with two TCI states and having the same QCL-typeD property as the first reference CORESET; or perform PDCCH monitoring in the CORESET associated with two TCI states and having the same QCL-typeD property as the first reference CORESET.

In addition, regarding the first reference CORESET, it can be understood that the first reference CORESET is one of the M CORESETs associated with two TCI states, that is, the first reference CORESET is a CORESET associated with two TCI states. The first reference CORESET may be determined from the M CORESETs associated with two TCI states according to a certain rule.

In addition, since a CORESET may be associated with one or two TCI states and each TCI state may be associated with QCL-typeD, in embodiments of the disclosure, it is possible to select a CORESET by determining whether QCL-typeD properties corresponding to TCI states for different CORESETs are the same. If a CORESET is associated with two TCI states, namely a first TCI state and a second TCI state, a QCL-typeD property corresponding to the first TCI state may be the same as or different from a QCL-typeD property corresponding to the second TCI state.

Regarding the CORESET associated with two TCI states and having the same QCL-typeD property as the first reference CORESET, it can be understood that, in embodiments of the disclosure, the first reference CORESET may be taken as a reference CORESET associated with two TCI states. Based on the first reference CORESET, a CORESET having the same QCL-typeD property as the first reference CORESET can be selected from the M CORESETs associated with two TCI states and the N CORESETs associated with one TCI state, thereby obtaining other CORESETs. As such, PDCCH monitoring can be performed in these CORESETs selected.

Since the first reference CORESET is associated with two TCI states, when selecting a CORESET having the same QCL-typeD property as the first reference CORESET from the M CORESETs associated with two TCI states, it is necessary to ensure that QCL-typeD properties corresponding to two TCI states for the selected CORESET (where the QCL-typeD properties corresponding to the two TCI states are different from each other) are the same as QCL-typeD properties corresponding to the two TCI states for the first reference CORESET (i.e. two QCL-typeD properties for the first reference CORESET); alternatively, it is necessary to ensure that the QCL-typeD properties corresponding to the two TCI states for the selected CORESET (where the QCL-typeD properties corresponding to the two TCI states are the same) are the same as one of the QCL-typeD properties corresponding to the two TCI states for the first reference CORESET (i.e. the two QCL-typeD properties for the first reference CORESET). The related elaborations in case 1 (for example, QCL-typeD properties corresponding to two TCI states for a CORESET are different or the same, and CORESETs have the same QCL-typeD property, etc.) can be applied to the related elaborations in the subsequent technical solutions such as case 2 (for example, a second reference CORESET, a third reference CORESET, a first CORESET, a second CORESET, a third CORESET, etc.), which is not elaborated herein.

For example, the two TCI states for the first reference CORESET are a third TCI state and a fourth TCI state, a QCL-typeD property corresponding to the third TCI state may be the same as or different from a QCL-typeD property corresponding to the fourth TCI state, and two TCI states for the selected CORESET are a fifth TCI state and a sixth TCI state. If a QCL-typeD property corresponding to the fifth TCI state is different from a QCL-typeD property corresponding to the sixth TCI state, the QCL-typeD property corresponding to the third TCI state is the same as the QCL-typeD property corresponding to the fifth TCI state, and the QCL-typeD property corresponding to the fourth TCI state is the same as the QCL-typeD property corresponding to the sixth TCI state; or the QCL-typeD property corresponding to the third TCI state is the same as the QCL-typeD property corresponding to the sixth TCI state, and the QCL-typeD property corresponding to the fourth TCI state is the same as the QCL-typeD property corresponding to the fifth TCI state. If the QCL-typeD property corresponding to the fifth TCI state is the same as the QCL-typeD property corresponding to the sixth TCI state, the QCL-typeD property corresponding to the third TCI state is the same as the QCL-typeD property corresponding to the fifth TCI state (or the sixth TCI state); or the QCL-typeD property corresponding to the fourth TCI state is the same as the QCL-typeD property corresponding to the fifth TCI state (or the sixth TCI state).

An example is given below for illustration.

Example 1: in overlapping PDCCH monitoring occasions on an active downlink BWP, the following CORESETs exist (where M=2 and N=2): CORESET #0 (associated with one TCI state), CORESET #1 (associated with two TCI states), CORESET #2 (associated with one TCI state), and CORESET #3 (associated with two TCI states). A QCL-typeD property corresponding to one TCI state for CORESET #1 is the same as a QCL-typeD property corresponding to the TCI state for CORESET #0. QCL-typeD properties corresponding to the two TCI states for CORESET #1 are the same as two QCL-typeD properties for CORESET #3.

Since in case 1, only PDCCH monitoring of the terminal in a CORESET associated with two TCI states is taken into consideration, CORESET #0 and CORESET #2 can be firstly excluded, and CORESET #1 and CORESET #3 are taken into consideration. If the first reference CORESET is CORESET #1, since a QCL-typeD property corresponding to only one TCI state for CORESET #1 is the same as the QCL-typeD property for CORESET #0, and the QCL-typeD properties corresponding to the two TCI states for CORESET #1 are the same as the QCL-typeD properties for CORESET #3, accordingly, the terminal performs PDCCH monitoring in CORESET #1 and/or CORESET #3.

With reference to the above illustration, a rule for determining the first reference CORESET from the M CORESETs associated with two TCI states will be elaborated below in embodiments of the disclosure.

Rule 1-1

In a possible example, in overlapping PDCCH monitoring occasions on an active downlink BWP, if a first cell set has a cell corresponding to a CORESET associated with two TCI states and associated with a CSS, the first reference CORESET may be: a CORESET that is associated with two TCI states and associated with a CSS with the lowest index in a cell with the lowest index among at least one cell corresponding to a CORESET associated with two TCI states and associated with a CSS in the first cell set, where the first cell set includes cells corresponding to the M CORESETs associated with two TCI states and cells corresponding to the N CORESETs associated with one TCI state.

It should be noted that, each search space may be associated with one CORESET and a search space may include a CSS and an USS, and therefore, each CORESET may be associated with (or correspond to) a CSS and/or an USS.

In overlapping PDCCH monitoring occasions on an active downlink BWP, since each of the M CORESETs associated with two TCI states may correspond to (or be associated with) one cell, and each of the N CORESETs associated with one TCI state may correspond to (or be associated with) one cell, the first cell set in embodiments of the disclosure includes cells corresponding to the M CORESETs associated with two TCI states and cells corresponding to the N CORESETs associated with one TCI state.

For example, in overlapping PDCCH monitoring occasions on an active downlink BWP, there is at least one CORESET, and a cell associated with the at least one CORESET includes cell 1, cell 2, and cell 3, that is, the first cell set includes cell 1, cell 2, and cell 3. Cell 1 is associated with CORESET #1_1 (associated with one TCI state, and associated with only an USS) and CORESET #1_2 (associated with one TCI state, and associated with only a CSS). Cell 2 is associated with CORESET #2_1 (associated with one TCI state, and associated with only an USS) and CORESET #2_2 (associated with two TCI states, and associated with a CSS). Cell 3 is associated with CORESET #3_1 (associated with two TCI states, and associated with an USS) and CORESET #3_2 (associated with two TCI states, and associated with a CSS).

In addition, the first cell set may have some cells (such as cell 2 above) corresponding to a CORESET associated with two TCI states and associated with a CSS, or all cells in the first cell set may correspond to a CORESET associated with two TCI states and associated with a CSS, or the first cell set may have no cell corresponding to a CORESET associated with two TCI states and associated with a CSS. Therefore, if the first cell set has a cell corresponding to a CORESET associated with two TCI states and associated with a CSS, a CORESET associated with two TCI states and associated with a CSS with the lowest index in a cell with the lowest index among at least one cell corresponding to a CORESET associated with two TCI states and associated with a CSS in the first cell set is taken as the first reference CORESET. That is, a CORESET associated with two TCI states and associated with a CSS is firstly selected from the first cell set to obtain at least one CORESET, then a cell corresponding to the at least one CORESET is determined to obtain at least one cell, and a cell with the lowest index is selected from the at least one cell, and finally, a CORESET associated with two TCI states and associated with a CSS with the lowest index is selected from the cell with the lowest index, thereby obtaining the first reference CORESET.

In addition, each cell has a corresponding index (cell index), and therefore, in embodiments of the disclosure, a cell with the lowest index can be selected from multiple cells according to a "lowest index" principle. Similarly, each CSS has a corresponding index, and therefore, in embodiments of the disclosure, a CORESET associated with a CSS with the lowest index can be selected from multiple CORESETs associated with (corresponding to) a CSS according to a "lowest index" principle.

As can be seen, in embodiment of the disclosure, based on rule 1-1 described in this example, it is possible to determine accurately and quickly a CORESET (namely, the first reference CORESET) associated with two TCI states and associated with (corresponding to) a CSS with the lowest index in overlapping PDCCH monitoring occasions on an active downlink BWP. As such, the terminal can perform PDCCH monitoring only in a CORESET associated with two TCI states, thereby ensuring flexibility, robustness, and stability of system communication.

With reference to the above illustration, rule 1-1 may also be described as follows.

In a possible example, in overlapping PDCCH monitoring occasions on an active downlink BWP, if a second CORESET includes a CORESET associated with two TCI states and associated with a CSS, the first reference CORESET is: a CORESET that belongs to the second CORESET and is associated with a CSS with the lowest index in a cell with the lowest index among at least one cell corresponding to a CORESET associated with two TCI states and associated with a CSS in the second CORESET, where the second CORESET includes the M CORESETs associated with two TCI states and the N CORESETs associated with one TCI state.

It can be understood that, a CORESET associated with two TCI states and associated with a CSS is firstly selected from the second CORESET to obtain at least one CORESET, then a cell corresponding to the at least one CORESET is determined to obtain at least one cell, and a cell with the lowest index is selected from the at least one cell, and finally, a CORESET belonging to the second CORESET and associated with a CSS with the lowest index is selected from the cell with the lowest index, thereby obtaining the first reference CORESET.

Rule 1-2

In a possible example, in overlapping PDCCH monitoring occasions on an active downlink BWP, if a first cell set does not have a cell corresponding to a CORESET associated with two TCI states and associated with a CSS, the first reference CORESET may be: a CORESET that is associated with two TCI states and associated with an USS with the lowest index in a cell with the lowest index among at least one cell corresponding to a CORESET associated with two TCI states and associated with an USS in the first cell set.

The first cell set includes cells corresponding to the M CORESETs associated with two TCI states and cells corresponding to the N CORESETs associated with one TCI state.

It should be noted that, similar to the above elaborations, it can be seen that an USS has a corresponding index, and therefore, in embodiments of the disclosure, a CORESET associated with an USS with lowest index can be selected from multiple CORESETs associated with (corresponding to) an USS according to a "lowest index" principle.

In addition, if the first cell set does not have a cell corresponding to a CORESET associated with two TCI states and associated with a CSS, a CORESET associated with two TCI states and associated with an USS with the lowest index in a cell with the lowest index among at least one cell corresponding to a CORESET associated with two TCI states and associated with an USS in the first cell set is taken as the first reference CORESET. That is, a CORESET associated with two TCI states and associated with an USS is firstly selected from the first cell set to obtain at least one CORESET, then a cell corresponding to the at least one CORESET is determined to obtain at least one cell, and a cell with the lowest index is selected from the at least one cell, and finally, a CORESET associated with two TCI states and associated with an USS with lowest index is selected from the cell with the lowest index, thereby obtaining the first reference CORESET.

As can be seen, in embodiments of the disclosure, based on rule 1-2 described in this example, it is possible to determine accurately and quickly a CORESET (namely, the first reference CORESET) associated with two TCI states and associated with (corresponding to) an USS with the lowest index in overlapping PDCCH monitoring occasions on an active downlink BWP. In this way, the terminal can perform PDCCH monitoring only in a CORESET associated with two TCI states, thereby ensuring flexibility, robustness, and stability of system communication.

With reference to the above illustration, rule 1-2 may also be described as follows.

In a possible example, in overlapping PDCCH monitoring occasions on an active downlink BWP, if a second CORESET does not include a CORESET associated with two TCI states and associated with a CSS, the first reference CORESET may be: a CORESET that belongs to the second CORESET and is associated with an USS with the lowest index in a cell with the lowest index among at least one cell corresponding to a CORESET associated with two TCI states and associated with an USS in the second CORESET, where the second CORESET includes the M CORESETs associated with two TCI states and the N CORESETs associated with one TCI state.

It can be understood that, a CORESET associated with two TCI states and associated with an USS is firstly selected from the second CORESET to obtain at least one CORESET, then a cell corresponding to the at least one CORESET is determined to obtain at least one cell, and a cell with the lowest index is selected from the at least one cell, and finally, a CORESET belonging to the second CORESET and associated with an USS with the lowest index is selected from the cell with the lowest index, thereby obtaining the first reference CORESET.

Rule 1-1 and rule 1-2 will be exemplified below in embodiments of the disclosure.

Example 2: in overlapping PDCCH monitoring occasions on an active downlink BWP, the following CORESETs exist (where M=3 and N=3). Cell 1: CORESET #0 (associated with one TCI state, and associated with a CSS), CORESET #2 (associated with two TCI states, and associated with CSS #1), CORESET #3 (associated with one TCI state, and associated with a CSS), and CORESET #4 (associated with two TCI states, and associated with an USS). A QCL-typeD property corresponding to one TCI state for CORESET #2 corresponding to cell 1 is the same as a QCL-typeD property corresponding to the TCI state for CORESET #0 corresponding to cell 1. QCL-typeD properties corresponding to the two TCI states corresponding to CORESET #4 for cell 1 are the same as two QCL-typeD properties for CORESET #2 corresponding to cell 1. Cell 2: CORESET #1 (associated with one TCI state, and associated with only an USS), and CORESET #2 (associated with two TCI states, and associated with CSS #2). A QCL-typeD property corresponding to one TCI state for CORESET #2 corresponding to cell 2 is the same as a QCL-typeD property corresponding to the TCI state for CORESET #1 corresponding to cell 2. A QCL-typeD property corresponding to another TCI state for CORESET #2 corresponding to cell 2 is the same as a QCL-typeD property corresponding to one TCI state for CORESET #2 corresponding to cell 1.

In the overlapping PDCCH monitoring occasions on the active downlink BWP, a cell associated with the above CORESETs includes cell 1 and cell 2, i.e. the first cell set includes cell 1 and cell 2. A CORESET associated with cell 1 includes CORESET #0, CORESET #2, CORESET #3, and CORESET #4. A CORESET associated with cell 2 include CORESET #1 and CORESET #2. A cell index corresponding to cell 1 is lower than an index corresponding to cell 2. In addition, CORESET #0 corresponding to cell 1 is associated with one TCI state, and a search space associated with CORESET #0 corresponding to cell 1 includes a CSS, where the CSS is associated with one or more PDCCH candidates, and the other CORESETs will not be described again herein.

In addition, since cell 1 and cell 2 each have a CORESET associated with two TCI states, and CORESET #2 corresponding to cell 1 is associated with a CSS and CORESET #2 corresponding to cell 2 is associated with a CSS, the first cell set has a cell corresponding to a CORESET associated with two TCI states and associated with a CSS, thereby determining, according to rule 1-1, that the first reference CORESET is CORESET #2 corresponding to cell 1.

A cell corresponding to a CORESET associated with two TCI states and associated with a CSS is firstly selected from the first cell set, thereby obtaining cell 1 and cell 2. Then, a cell with the lowest index, i.e. cell 1, is selected from cell 1 and cell 2, and CORESET #2 and CORESET #4 associated with two TCI states are selected from cell 1. Finally, a CORESET associated with a CSS with the lowest index is selected from CORESET #2 and CORESET #4, thereby obtaining CORESET #2 corresponding to cell 1.

Further, other CORESETs associated with two TCI states and having the same QCL-typeD property as the first reference CORESET are selected from the CORESETs corresponding to cell 1 that are associated with two TCI states and the CORESETs corresponding to cell 2 that are associated with two TCI states. Since a QCL-typeD property corresponding to only one TCI state for CORESET #2 corresponding to cell 2 is the same as a QCL-typeD property for the first reference CORESET, CORESET #2 corresponding to cell 2 is excluded, and accordingly, the other CORESETs selected include CORESET #4 corresponding to cell 1.

Accordingly, the terminal performs PDCCH monitoring in CORESET #2 corresponding to cell 1 and/or CORESET #4 corresponding to cell 1. As such, it is possible for the terminal to realize PDCCH monitoring only in a CORESET associated with two TCI states when the terminal supports a CORESET configured with two TCI states, thereby ensuring flexibility, robustness, and stability of system communication.

Case 2

In a possible example, the terminal may perform PDCCH monitoring in the M CORESETs associated with two TCI states and/or the N CORESETs associated with one TCI state as follows. The terminal performs PDCCH monitoring in a second reference CORESET and/or a first CORESET, where the second reference CORESET is one of the M CORESETs associated with two TCI states and the N CORESETs associated with one TCI state, and the first CORESET is determined according to a QCL-typeD property for the second reference CORESET.

The first CORESET may include one or more of the M CORESETs associated with two TCI states and the N CORESETs associated with one TCI state.

It should be noted that, regarding case 2, it can be understood that, the terminal needs to perform PDCCH monitoring in a CORESET associated with two TCI states and a CORESET associated with one TCI state. The terminal may perform PDCCH monitoring according to the following three principles: perform PDCCH monitoring in the second reference CORESET; perform PDCCH monitoring in the second reference CORESET and the first CORESET; and perform PDCCH monitoring in the first CORESET.

Regarding the second reference CORESET, it can be understood that, the second reference CORESET is one of the M CORESETs associated with two TCI states and the N CORESETs associated with one TCI state, that is, the second reference CORESET is a CORESET associated with two states or one TCI state. The second reference CORESET may be determined from the M CORESETs associated with two TCI states and the N CORESETs associated with one TCI state according to a certain rule.

Regarding the first CORESET, it can be understood that, in embodiments of the disclosure, the second reference CORESET can be taken as a reference CORESET associated with two TCI states or one TCI state. Then, based on the QCL-typeD property for the second reference CORESET, the first CORESET is determined from the M CORESETs associated with two TCI states and the N CORESETs associated with one TCI state, thereby performing PDCCH monitoring in the first CORESET. In addition, the first CORESET may include at least one of the M CORESETs associated with two TCI states and the N CORESETs associated with one TCI state.

With reference to the above illustration, a rule for determining the second reference CORESET from the M CORESETs associated with two TCI states and the N CORESETs associated with one TCI state will be described in detail below in embodiments of the disclosure.

Rule 2-1

In a possible example, in overlapping PDCCH monitoring occasions on an active downlink BWP, if a first cell set has a cell corresponding to a CORESET associated with a CSS, the second reference CORESET may be: a CORESET associated with a CSS with the lowest index in a cell with the lowest index among cells corresponding to a CORESET associated with a CSS in the first cell set.

It should be noted that, different from the case where the first reference CORESET is a CORESET associated with two TCI states described above, the second reference CORESET in rule 2-1 may be a CORESET associated with two TCI states, or may be a CORESET associated with one TCI state.

In addition, if the first cell set has a cell corresponding to a CORESET associated with a CSS, a CORESET associated with a CSS with the lowest index in a cell with the lowest index among cells corresponding to a CORESET associated with a CSS in the first cell set is taken as the second reference CORESET. That is, at least one cell corresponding to a CORESET associated with a CSS and associated with one or two TCI states is firstly selected from the first cell set, then a cell with the lowest index is selected from the at least one cell, and a CORESET associated with a CSS with the lowest index is selected from the cell with the lowest index, thereby obtaining the second reference CORESET.

As can be seen, different from the first reference CORESET that is required to be a CORESET associated with two TCI states, the second reference CORESET in rule 2-1 may be a CORESET associated with two TCI states or one TCI state. On the other hand, in embodiments of the disclosure, based on rule 2-1 described in this example, in overlapping PDCCH monitoring occasions on an active downlink BWP, it is possible to determine accurately and quickly a CORESET (namely, the second reference CORESET) associated with two TCI states or one TCI state and associated with (corresponding to) a CSS with the lowest index in a cell with the lowest index among cells corresponding to a CORESET associated with a CSS. In this way, it is possible for the terminal to realize PDCCH monitoring a CORESET associated with two TCI states or one TCI state, thereby ensuring flexibility, robustness, and stability of system communication.

With reference to the above illustration, rule 2-1 may also be described as follows.

In a possible example, in overlapping PDCCH monitoring occasions on an active downlink BWP, if a second CORESET includes a CORESET associated with a CSS, the second reference CORESET is: a CORESET that belongs to the second CORESET and is associated with a CSS with lowest index in a cell with the lowest index among at least one cell corresponding to a CORESET associated with a CSS in the second CORESET, where the second CORESET includes the M CORESETs associated with two TCI states and the N CORESETs associated with one TCI state.

It can be understood that, a CORESET associated with a CSS is firstly selected from the second CORESET to obtain at least one CORESET, then a cell corresponding to the at least one CORESET is determined to obtain at least one cell, and a cell with the lowest index is selected from the at least one cell, and finally, a CORESET belonging to the second CORESET and associated with a CSS with the lowest index is selected from the cell with the lowest index, thereby obtaining the second reference CORESET.

Rule 2-2

In a possible example, in overlapping PDCCH monitoring occasions on an active downlink BWP, if a first cell set does not have a cell corresponding to a CORESET associated with a CSS, the second reference CORESET may be: a CORESET associated with an USS with the lowest index in a cell with the lowest index among cells corresponding to a CORESET associated with an USS in the first cell set.

It should be noted that, similar to the above elaborations, it can be seen that different from the first reference CORESET that is required to be a CORESET associated with two TCI states, the second reference CORESET in rule 2-2 may be a CORESET associated with two TCI states or one TCI state.

In addition, if the first cell set does not have a cell corresponding to a CORESET associated with a CSS, a CORESET associated with an USS with the lowest index in a cell with the lowest index among cells corresponding to a CORESET associated with an USS in the first cell set is taken as the second reference CORESET. That is, at least one cell corresponding to a CORESET associated with an USS and associated with one or two TCI states is firstly selected from the first cell set, then a cell with the lowest index is selected from the at least one cell, and finally, a CORESET associated with an USS with the lowest index is selected from the cell with the lowest index, thereby obtaining the second reference CORESET.

As can be seen that, in embodiments of the disclosure, based on rule 2-2 described in this example, it is possible to determine accurately and quickly a CORESET (namely, the second reference CORESET) associated with two TCI states or one TCI state and associated with (corresponding to) an USS with the lowest index in overlapping PDCCH monitoring occasions on an active downlink BWP. As such, it is possible for the terminal to realize PDCCH monitoring in a CORESET associated with two TCI states or one TCI state, thereby ensuring flexibility, robustness, and stability of system communication.

With reference to the above illustration, rule 2-2 may also be described as follows.

In a possible example, in overlapping PDCCH monitoring occasions on an active downlink BWP, if a second CORESET does not include a CORESET associated with a CSS, the second reference CORESET may be: a CORESET that belongs to the second CORESET and is associated with an USS with the lowest index in a cell with the lowest index among at least one cell corresponding to a CORESET associated with an USS in the second CORESET, where the second CORESET includes the M CORESETs associated with two TCI states and the N CORESETs associated with one TCI state.

It can be understood that, a CORESET associated with an USS is firstly selected from the second CORESET to obtain at least one CORESET, then a cell corresponding to the at least one CORESET is determined to obtain at least one cell, and a cell with the lowest index is selected from the at least one cell, and finally, a CORESET belonging to the second CORESET and associated with an USS with the lowest index is selected from the cell with the lowest index, thereby obtaining the second reference CORESET.

With reference to the above elaborations, a rule for determining the first CORESET from the M CORESETs associated with two TCI states and the N CORESETs associated with one TCI state according to the QCL-typeD property for the second reference CORESET will be described in detail below in embodiments of the disclosure.

Rule 2-x-1 (x=1 or 2)

In a possible example, if the second reference CORESET is a CORESET associated with one TCI state, the first CORESET may include: at least one CORESET associated with two TCI states and having the same QCL-typeD property as the second reference CORESET among the M CORESETs associated with two TCI states, and/or at least one CORESET associated with one TCI state and having the same QCL-typeD property as the second reference CORESET among the N CORESETs associated with one TCI state.

It can be understood that, if the second reference CORESET is a CORESET associated with one TCI state, the first CORESET may include the following three cases: at least one CORESET associated with two TCI states and having the same QCL-typeD property as the second reference CORESET among the M CORESETs associated with two TCI states, and at least one CORESET associated with one TCI state and having the same QCL-typeD property as the second reference CORESET among the N CORESETs associated with one TCI state; at least one CORESET associated with two TCI states and having the same QCL-typeD property as the second reference CORESET among the M CORESETs associated with two TCI states and the N CORESETs associated with one TCI state; at least one CORESET associated with one TCI state and having the same QCL-typeD property as the second reference CORESET among the M CORESETs associated with two TCI states and the N CORESETs associated with one TCI state.

It should be noted that, in rule 2-x-1, the first CORESET includes at least one CORESET associated with one TCI state and/or at least one CORESET associated with two TCI states, where the CORESET associated with one TCI state has the same QCL-typeD property as the second reference CORESET, and a QCL-typeD property corresponding to one TCI state for the CORESET associated with two TCI states is the same as the QCL-typeD property for the second reference CORESET, and in addition, QCL_typeD properties corresponding to the two TCI states may be the same or different.

Rule 2-x-1 will be exemplified below.

Example 3: in overlapping PDCCH monitoring occasions on an active downlink BWP, the following CORESETs exist (where M=3 and N=3): CORESET #0 (associated with one TCI state, and associated with a CSS), CORESET #1 (associated with two TCI states, and associated with a CSS), CORESET #2 (associated with one TCI state, and associated with a CSS), CORESET #3 (associated with two TCI states, and associated with an USS), CORESET #4 (associated with one TCI state, and associated with an USS), and CORESET #5 (associated with two TCI states, and associated with an USS). A QCL-typeD property corresponding to the TCI state for CORESET #0 is the same as a QCL-typeD property corresponding to one TCI state for CORESET #1. QCL-typeD properties corresponding to the two TCI states for CORESET #3 are the same as two QCL-typeD properties for the CORESET #1. A QCL-typeD property corresponding to the TCI state for CORESET #2 is different from the QCL-typeD property corresponding to the TCI state for CORESET #0. A QCL-typeD property corresponding to the TCI state for CORESET #4 is the same as the QCL-typeD property corresponding to the TCI state for CORESET #0. QCL-typeD properties corresponding to the two TCI states for CORESET #5 are the same, and are also the same as the QCL-typeD property for CORESET #0.

Since in rule 2-x-1, only the case where the second reference CORESET is a CORESET associated with one TCI state is taken into consideration, if the second reference CORESET is CORESET #0, according to rule 2-x-1, the first CORESET may include the following three cases: CORESET #1, CORESET #3, CORESET #4, and CORESET #5; CORESET #1, CORESET #3, and CORESET #5; CORESET #4.

Rule 2-x-2

In a possible example, if the second reference CORESET is a CORESET associated with one TCI state, the first CORESET may include: a CORESET associated with two TCI states and having the same QCL-typeD property as the second reference CORESET among the M CORESETs associated with two TCI states, where QCL-typeD properties corresponding to the two TCI states for the CORESET associated with two TCI states are the same; and/or a CORESET associated with one TCI state and having the same QCL-typeD property as the second reference CORESET among the N CORESETs associated with one TCI state.

It should be noted that, different from rule 2-x-1 where it is only required that a QCL-typeD property corresponding to one of two TCI states for a CORESET associated with two TCI states in the first CORESET is the same as the QCL-typeD property for the second reference CORESET, in rule 2-x-2, it is required that QCL-typeD properties corresponding to the two TCI states for the CORESET associated with two TCI states in the first CORESET are the same, and are also the same as the QCL-typeD property for the second reference CORESET.

For example, in example 3 above, if the second reference CORESET is CORESET #0, according to rule 2-x-2, the first CORESET may include the following three cases: CORESET #4 and CORESET #5; CORESET #4; CORESET #5.

Rule 2-x-3

In a possible example, if the second reference CORESET is a CORESET associated with one TCI state, the first CORESET may include: a CORESET associated with two TCI states and having the same QCL-typeD property as a third reference CORESET among the M CORESETs associated with two TCI states, and/or a CORESET associated with one TCI state and having the same QCL-typeD property as the second reference CORESET among the N CORESETs associated with one TCI state, where the third reference CORESET is a CORESET determined from the M CORESETs associated with two TCI states according to the QCL-typeD property for the second reference CORESET.

Specifically, one of QCL-typeD properties for the third reference CORESET SET is the same as the QCL-typeD property for the second reference CORESET.

It should be noted that, regarding the CORESET associated with one TCI state and having the same QCL-typeD property as the second reference CORESET, it can be understood that, since the second reference CORESET is a CORESET associated with one TCI state, a CORESET having the same QCL-typeD property as the second reference CORESET is selected from the N CORESETs associated with one TCI state.

Regarding the third reference CORESET, it can be understood that, the third reference CORESET is a CORESET determined from the M CORESETs associated with two TCI states according to the QCL-typeD property for the second reference CORESET, that is, the third reference CORESET is a CORESET associated with two TCI states. The third reference CORESET may be selected from the M CORESETs associated with two TCI states according to a certain rule.

If the second reference CORESET is a CORESET associated with one TCI state, the first CORESET may include the following three cases: a CORESET associated with two TCI states and having the same QCL-typeD property as the third reference CORESET among the M CORESETs associated with two TCI states, and a CORESET associated with one TCI state and having the same QCL-typeD property as the second reference CORESET among the N CORESETs associated with one TCI state; a CORESET associated with one TCI state and having the same QCL-typeD property as the second reference CORESET among the M CORESETs associated with two TCI states and the N CORESETs associated with one TCI state; a CORESET associated with two TCI states and having the same QCL-typeD property as the third reference CORESET among the M CORESETs associated with two TCI states and the N CORESETs associated with one TCI state.

Regarding the CORESET associated with two TCI states and having the same QCL-typeD property as the third reference CORESET, it can be understood that, in embodiments of the disclosure, the third reference CORESET may be taken as a reference CORESET associated with two TCI states, and then based on the third reference CORESET, a CORESET having the same QCL-typeD property as the third reference CORESET is selected from the M CORESETs associated with two TCI states to obtain other CORESETs (namely, the first CORESET), thereby performing PDCCH monitoring in these CORESETs.

Since the third reference CORESET is associated with two TCI states, when selecting a CORESET having the same QCL-typeD property as the third reference CORESET from the M CORESETs associated with two TCI states, it is necessary to ensure that QCL-typeD properties corresponding to two TCI states for the selected CORESET are the same as QCL-typeD properties corresponding to the two TCI states for the third reference CORESET.

With reference to the above elaborations, a rule for selecting the third reference CORESET from the M CORESETs associated with two TCI states will be described in detail below in embodiments of the disclosure.

Rule 2-x-3-1

In a possible example, in overlapping PDCCH monitoring occasions on an active downlink BWP, if a third CORESET includes a CORESET associated with a CSS, the third reference CORESET may be: a CORESET that belongs to the third CORESET and is associated with a CSS with the lowest index in a cell with the lowest index among at least one cell corresponding to a CORESET associated with a CSS in the third CORESET, where the third CORESET includes: at least one CORESET having the same QCL-typeD property as the second reference CORESET and associated with two TCI states among the M CORESETs associated with two TCI states.

It should be noted that, regarding the third CORESET, it can be understood that, in embodiments of the disclosure, at least one CORESET having the same QCL-typeD property as the second reference CORESET can be selected from the M CORESETs associated with two TCI states to obtain the third CORESET. That is, since the second reference CORESET is a CORESET associated with one TCI state, the third CORESET includes at least one CORESET associated with two TCI states, and a QCL-typeD property corresponding to at least one of the two TCI states is the same as the QCL-typeD property for the second reference CORESET.

The third CORESET may have some CORESETs associated with (corresponding to) a CSS; or all CORESETs in the third CORESET are not associated with (do not correspond to) a CSS, that is, the third CORESET has no CORESET associated with a CSS.

If the third CORESET includes a CORESET associated with a CSS, a CORESET that belongs to the third CORESET and is associated with a CSS with the lowest index in a cell with the lowest index among at least one cell corresponding to a CORESET associated with (corresponding to) a CSS in the third CORESET is taken as the third reference CORESET. That is, at least one CORESET having the same QCL-typeD property as the second reference CORESET is firstly selected from the M CORESETs associated with two TCI states to obtain the third CORESET, then a CORESET associated with a CSS is selected from the third CORESET to obtain at least one CORESET, a cell corresponding to the at least one CORESET is determined to obtain at least one cell, and a cell with the lowest index is selected from the at least one cell, and finally, a CORESET belonging to the third CORESET and associated with a CSS with the lowest index is selected from the cell with the lowest index, thereby obtaining the third reference CORESET.

As can be seen, in embodiments of the disclosure, based on rule 2-x-3-1 described in this example, in overlapping PDCCH monitoring occasions on an active downlink BWP, it is possible to determine accurately and quickly a CORESET (namely, the second reference CORESET) associated with one TCI state and associated with (corresponding to) a CSS or USS with the lowest index and a CORESET (namely, the third reference CORESET) associated with two TCI states and associated with (corresponding to) a CSS with the lowest index. In this way, it is possible for the terminal to realize PDCCH monitoring in a CORESET associated with one TCI state and a CORESET associated with two TCI states, thereby ensuring flexibility, robustness, and stability of system communication.

Rule 2-x-3-2:

In a possible example, in overlapping PDCCH monitoring occasions on an active downlink BWP, if a third CORESET does not include a CORESET associated with a CSS, the third reference CORESET may be: a CORESET that belongs to the third CORESET and is associated with an USS with the lowest index in a cell with the lowest index among at least one cell corresponding to a CORESET associated with an USS in the third CORESET, where the third CORESET includes: at least one CORESET having the same QCL-typeD property as the second reference CORESET and associated with two TCI states among the M CORESETs associated with two TCI states.

It should be noted that, if the third CORESET does not include a CORESET associated with a CSS, a CORESET that belongs to the third CORESET and is associated with an USS with the lowest index in a cell with the lowest index among at least one cell corresponding to a CORESET associated with (corresponding to) an USS in the third CORESET is taken as the third reference CORESET. That is, at least one CORESET having the same QCL-typeD property as the second reference CORESET is firstly selected from the M CORESETs associated with two TCI states to obtain the third CORESET, then a CORESET associated with an USS is selected from the third CORESET to obtain at least one CORESET, a cell corresponding to the at least one CORESET is determined to obtain at least one cell, and a cell with the lowest index is selected from the at least one cell, and finally, a CORESET belonging to the third CORESET and associated with an USS with the lowest index is selected from the cell with the lowest index, thereby obtaining the third reference CORESET.

As can be seen, in embodiments of the disclosure, based on rule 2-x-3-2 described in this example, in overlapping PDCCH monitoring occasions on an active downlink BWP, it is possible to determine accurately and quickly a CORESET (namely, the second reference CORESET) associated with one TCI state and associated with (corresponding to) a CSS or USS with the lowest index and a CORESET (namely, the third reference CORESET) associated with two TCI states and associated with (corresponding to) an USS with the lowest index. In this way, it is possible for the terminal to realize PDCCH monitoring in a CORESET associated with one TCI state and a CORESET associated with two TCI states, thereby ensuring flexibility, robustness, and stability of system communication.

Rule 2-1, rule 2-2, rule 2-x-3, rule 2-x-3-1, and rule 2-x-3-2 will be exemplified below.

Example 4: in overlapping PDCCH monitoring occasions on an active downlink BWP, the following CORESETs exist (where M=4, N=3). Cell 1: CORESET #0 (associated with one TCI state, and associated with CSS #0), CORESET #2 (associated with two TCI states, and associated with CSS #1), CORESET #3 (associated with one TCI state, and associated with CSS #2), and CORESET #4 (associated with two TCI states, and associated with an USS). A QCL-typeD property corresponding to one TCI state for CORESET #2 corresponding to cell 1 is the same as a QCL-typeD property corresponding to the TCI state for CORESET #0 corresponding to cell 1. QCL-typeD properties corresponding to the two TCI states for CORESET #4 corresponding to cell 1 are the same as two QCL-typeD properties for CORESET #2 corresponding to cell 1. A QCL-typeD property corresponding to the TCI state for CORESET #3 corresponding to cell 1 is different from the QCL-typeD property corresponding to the TCI state for CORESET #0 corresponding to cell 1. Cell 2: CORESET #1 (associated with one TCI state, and associated with only an USS), CORESET #2 (associated with two TCI states, and associated with a CSS), and CORESET #3 (associated with two TCI states, and associated with an USS). A QCL-typeD property corresponding to one TCI state for CORESET #2 corresponding to cell 2 is the same as a QCL-typeD property corresponding to the TCI state for the CORESET #1 corresponding to cell 2. A QCL-typeD property corresponding to another TCI state for CORESET #2 corresponding to cell 2 is the same as a QCL-typeD property corresponding to one TCI state for CORESET #2 corresponding to cell 1. The QCL-typeD property corresponding to the TCI state for CORESET #1 corresponding to cell 2 is the same as the QCL-typeD property corresponding to the TCI state for CORESET #0 corresponding to cell 1. QCL-typeD properties corresponding to the two TCI states for CORESET #3 corresponding to cell 2 are the same, and are the same as the QCL-typeD property for CORESET #0 corresponding to cell 1.

In the overlapping PDCCH monitoring occasions on the active downlink BWP, a cell associated with the CORESETs described above includes cell 1 and cell 2, and a cell index corresponding to cell 1 is lower than an index corresponding to cell 2. Since cell 1 and cell 2 each have a CORESET associated with an CSS, according to rule 2-1, it is determined that the second reference CORESET is CORESET #0 corresponding to cell 1.

Cell 1 and cell 2 corresponding to a CORESET associated with a CSS and associated with one or two TCI states are firstly selected from cell 1 and cell 2, then a cell with the lowest index, i.e. cell 1, is selected from cell 1 and cell 2, and finally, a CORESET associated with a CSS with the lowest index is selected from CORESET #0, CORESET #2, and CORESET #3 corresponding to cell 1, thereby obtaining CORESET #0 corresponding to cell 1.

Then, since the second reference CORESET (CORESET #0 corresponding to cell 1) is a CORESET associated with one TCI state, according to rule 2-x-3, a CORESET having the same QCL-typeD property as the second reference CORESET (CORESET #0 corresponding to cell 1) is firstly selected from the N CORESETs associated with one TCI state (CORESET #0 and CORESET #3 corresponding to cell 1, and CORESET #1 corresponding to cell 2), thereby obtaining CORESET #1 corresponding to cell 2.

According to rule 2-x-3-1 and rule 2-x-3-2, at least one CORESET associated with two TCI states and having the same QCL-typeD property as the second reference CORESET (CORESET #0 corresponding to cell 1) is selected from the M CORESETs associated with two TCI states, thereby obtaining the third CORESET including: CORESET #2 corresponding to cell 1, CORESET #4 corresponding to cell 1, CORESET #2 corresponding to cell 2, and CORESET #3 corresponding to cell 2.

Since the third CORESET includes a CORESET associated with a CSS, according to rule 2-x-3-1, it is determined that the third reference CORESET is CORESET #2 corresponding to cell 1.

Firstly, a CORESET associated with a CSS (CORESET #2 corresponding to cell 1 and CORESET #2 corresponding to cell 2) is selected from the third CORESET, and at least one cell, i.e. cell 1 and cell 2, corresponding to the selected CORESETs is determined, then a cell with the lowest index, i.e. cell 1, is selected from cell 1 and cell 2, and finally, a CORESET belonging to the third CORESET and associated with a CSS with the lowest index is selected from cell 1, thereby obtaining CORESET #2 corresponding to cell 1.

According to rule 2-x-3, a CORESET associated with two TCI states and having the same QCL-typeD property as the third reference CORESET (CORESET #2 corresponding to cell 1) is selected from the M CORESETs associated with two TCI states, thereby obtaining CORESET #4 corresponding to cell 1 and CORESET #3 corresponding to cell 2. Accordingly, the first CORESET includes: CORESET #1 corresponding to cell 2; CORESET #4 corresponding to cell 1 and/or CORESET #3 corresponding to cell 2; and/or CORESET #2 corresponding to cell 1.

As can be seen, the terminal performs PDCCH monitoring in the second reference CORESET and/or the first CORESET. As such, it is possible for the terminal to realize PDCCH monitoring in a CORESET associated with one TCI state and a CORESET associated with two TCI states when the terminal supports a CORESET configured with two TCI states, thereby ensuring flexibility, robustness, and stability of system communication.

Rule 2-x-4 (x=1 or 2)

In a possible example, if the second reference CORESET is a CORESET associated with two TCI states, the first CORESET may include: a CORESET associated with two TCI states and having the same QCL-typeD property as the second reference CORESET among the M CORESETs associated with two TCI states, and/or a CORESET associated with one TCI state and having the same QCL-typeD property as at least one QCL-typeD property for the second reference CORESET among the N CORESETs associated with one TCI state.

It can be understood that, if the second reference CORESET is a CORESET associated with two TCI states, the first CORESET may include the following three cases: a CORESET associated with two TCI states and having the same QCL-typeD property as the second reference CORESET among the M CORESETs associated with two TCI states, and a CORESET associated with one TCI state and having the same QCL-typeD property as at least one QCL-typeD property for the second reference CORESET among the N CORESETs associated with one TCI state; a CORESET associated with two TCI states and having the same QCL-typeD property as the second reference CORESET among the M CORESETs associated with two TCI states and the N CORESETs associated with one TCI state; a CORESET associated with one TCI state and having the same QCL-typeD property as at least one QCL-typeD property for the second reference CORESET among the M CORESETs associated with two TCI states and the N CORESETs associated with one TCI state.

It should be noted that, in rule 2-x-4, the first CORESET includes at least one CORESET associated with one TCI state and/or at least one CORESET associated with two TCI states, where the QCL-typeD property for the CORESET associated with one TCI state is the same as at least one QCL-typeD property for the second reference CORESET, and QCL-typeD properties corresponding to the two TCI states for the CORESET associated with the two TCI states are the same as two QCL-typeD properties for the second reference CORESET.

For example, in example 3 described above, if the second reference CORESET is CORESET #1, according to rule 2-x-4, the first CORESET may include the following three cases: CORESET #0, CORESET #3, CORESET #4, and CORESET #5; CORESET #0 and CORESET #4; CORESET #3 and CORESET #5.

Rule 2-1, rule 2-2, and rule 2-x-4 will be exemplified below.

Example 5: in overlapping PDCCH monitoring occasions on an active downlink BWP, the following CORESETs (M=4, N=3) exist. Cell 1: CORESET #0 (associated with one TCI state, and associated with an USS), CORESET #2 (associated with two TCI states, and associated with a CSS), CORESET #3 (associated with one TCI state, and associated with an USS), CORESET #4 (associated with two TCI states, and associated with an USS). A QCL-typeD property corresponding to one TCI state for CORESET #2 corresponding to cell 1 is the same as a QCL-typeD property corresponding to the TCI state for CORESET #0 corresponding to cell 1. QCL-typeD properties corresponding to the two TCI states for CORESET #4 corresponding to cell 1 are the same as two QCL-typeD properties for CORESET #2 corresponding to cell 1. A QCL-typeD property corresponding to the TCI state for CORESET #3 corresponding to cell 1 is different from the QCL-typeD property corresponding to the TCI state for CORESET #0 corresponding to cell 1. Cell 2: CORESET #1 (associated with one TCI state, and associated with only an USS), CORESET #2 (associated with two TCI states, and associated with a CSS), CORESET #3 (associated with two TCI states, and associated with an USS). A QCL-typeD property corresponding to one TCI state for CORESET #2 corresponding to cell 2 is the same as a QCL-typeD property corresponding to the TCI state for CORESET #1 corresponding to cell 2. A QCL-typeD property corresponding to another TCI state for CORESET #2 corresponding to cell 2 is the same as a QCL-typeD property corresponding to one TCI state for CORESET #2 corresponding to cell 1. The QCL-typeD property corresponding to the TCI state for CORESET #1 corresponding to cell 2 is the same as the QCL-typeD property corresponding to the TCI state for CORESET #0 corresponding to cell 1. QCL-typeD properties corresponding to the two TCI states for CORESET #3 corresponding to cell 2 are the same, and are the same as the QCL-typeD property for CORESET #0 corresponding to cell 1.

In the overlapping PDCCH monitoring occasions on the active downlink BWP, a cell associated with the CORESETs described above includes cell 1 and cell 2, where a cell index corresponding to cell 1 is lower than an index corresponding to cell 2. Since cell 1 and cell 2 each have a CORESET associated with a CSS, according to the rule 2-1, it is determined that the second reference CORESET is CORESET #2 corresponding to cell 1.

Cell 1 and cell 2 corresponding to a CORESET associated with one or two TCI states and associated with a CSS are selected from cell 1 and cell 2, then a cell with the lowest index, i.e. cell 1, is selected from cell 1 and cell 2, and finally, a CORESET associated with a CSS with the lowest index is selected from CORESET #2 and CORESET #3 corresponding to cell 1, thereby obtaining CORESET #2 corresponding to cell 1.

Then, since the second reference CORESET (CORESET #2 corresponding to cell 1) is a CORESET associated with two TCI states, according to rule 2-x-4, a CORESET having the same QCL-typeD property as the second reference CORESET (CORESET #2 corresponding to cell 1) is selected from the M CORESETs associated with two TCI states (CORESET #2 and CORESET #4 corresponding to cell 1, and CORESET #2 and CORESET #3 corresponding to cell 2), thereby obtaining CORESET #4 corresponding to cell 1, CORESET #2 corresponding to cell 2, and CORESET #3 corresponding to cell 2.

According to rule 2-x-4, a CORESET having the same QCL-typeD property as at least one QCL-typeD property for the second reference CORESET (CORESET #2 corresponding to cell 1) is selected from the N CORESETs associated with one TCI state (CORESET #0 and CORESET #3 corresponding to cell 1, and CORESET #1 corresponding to cell 2), thereby obtaining CORESET #0 corresponding to cell 1 and CORESET #1 corresponding to cell 2.

Accordingly, the first CORESET includes: CORESET #4 corresponding to cell 1, CORESET #2 corresponding to cell 2, and CORESET #3 corresponding to cell 2; and/or CORESET #0 corresponding to cell 1 and CORESET #1 corresponding to cell 2.

As can be seen, the terminal performs PDCCH monitoring in the second reference CORESET and/or the first CORESET. As such, it is possible for the terminal to realize PDCCH monitoring in a CORESET associated with one TCI state and a CORESET associated with two TCI states when the terminal supports a CORESET configured with two TCI states, thereby ensuring flexibility, robustness, and stability of system communication.

The second reference CORESET in rule 2-1 and rule 2-2 in case 2 is a CORESET associated with two TCI states or one TCI state. The following will elaborate a case where the second reference CORESET is only a CORESET associated with two TCI states in case 2.

Rule 2-3

In a possible example, in overlapping PDCCH monitoring occasions on an active downlink BWP, if a second CORESET includes a CORESET associated with a CSS and associated with two TCI states, the second reference CORESET is: a CORESET in the second CORESET that is associated with a CSS with the lowest index and is associated with two TCI states in a cell with the lowest index among at least one cell corresponding to a CORESET associated with a CSS and associated with two TCI states in the second CORESET, where the second CORESET includes the M CORESETs associated with two TCI states and the N CORESETs associated with one TCI state.

It can be understood that, a CORESET associated with a CSS and associated with two TCI states is firstly selected from the second CORESET to obtain at least one CORESET, then a cell corresponding to the at least one CORESET is determined to obtain at least one cell, and a cell with the lowest index is selected from the at least one cell, and finally, a CORESET in the second CORESET that is associated with a CSS with the lowest index and associated with two TCI states is selected from the cell with the lowest index, thereby obtaining the second reference CORESET.

As can be seen, in embodiments of the disclosure, based on rule 2-3 described in this example, in overlapping PDCCH monitoring occasions on an active downlink BWP, it is possible to determine accurately and quickly a CORESET (namely, the second reference CORESET) associated with two TCI states and associated with (corresponding to) a CSS with a lowest index in a cell with the lowest index among cells corresponding to a CORESET associated with a CSS and associated with two TCI states. In this way, the terminal can perform PDCCH monitoring in a CORESET associated with two TCI states or one TCI state, thereby ensuring flexibility, robustness, and stability of system communication.

Rule 2-4

In a possible example, in overlapping PDCCH monitoring occasions on an active downlink BWP, if a second CORESET does not include a CORESET associated with a CSS and associated with two TCI states, the second reference CORESET may be: a CORESET in the second CORESET that is associated with an USS with the lowest index and associated with two TCI states in a cell with the lowest index among at least one cell corresponding to a CORESET associated with an USS and associated with two TCI states in the second CORESET, where the second CORESET includes the M CORESETs associated with two TCI states and the N CORESETs associated with one TCI state.

It can be understood that, a CORESET associated with an USS and associated with two TCI states is firstly selected from the second CORESET to obtain at least one CORESET, then a cell corresponding to the at least one CORESET is determined to obtain at least one cell, and a cell with the lowest index is selected from the at least one cell, and finally, a CORESET in the second CORESET that is associated with an USS with the lowest index and associated with two TCI states is selected from the cell with the lowest index, thereby obtaining the second reference CORESET.

As can be seen, in embodiments of the disclosure, based on rule 2-4 described in this example, it is possible to determine accurately and quickly a CORESET (namely, the second reference CORESET) associated with two TCI states and associated with (corresponding to) an USS with the lowest index in overlapping PDCCH monitoring occasions on an active downlink BWP, so that the terminal can perform PDCCH monitoring in a CORESET associated with two TCI states or one TCI state, thereby ensuring flexibility, robustness, and stability of system communication.

It should be noted that, different from the second reference CORESET in rule 2-1 and rule 2-2, the second reference CORESET in rule 2-3 and rule 2-4 is only a CORESET associated with two TCI states.

Rule 2-y-1 (y=3 or 4)

In a possible example, the second reference CORESET is a CORESET associated with two TCI states, and the first CORESET may include: a CORESET associated with two TCI states and having the same QCL-typeD property as the second reference CORESET among the M CORESETs associated with two TCI states, and/or a CORESET associated with one TCI state and having the same QCL-typeD property as at least one QCL-typeD property for the second reference CORESET among the N CORESETs associated with one TCI state.

It should be noted that, in rule 2-y-1, the first CORESET includes at least one CORESET associated with one TCI state and/or at least one CORESET associated with two TCI states, where the QCL-typeD property for the CORESET associated with one TCI state is the same as at least one QCL-typeD property for the second reference CORESET, and QCL-typeD properties corresponding to the two TCI states in the CORESET associated with the two TCI states are the same as two QCL-typeD properties for the second reference CORESET.

Rule 2-5

In a possible example, in overlapping PDCCH monitoring occasions on an active downlink BWP, if N>0 and a second CORESET includes a CORESET associated with a CSS and associated with one TCI state, the second reference CORESET is: a CORESET in the second CORESET that is associated with a CSS with the lowest index and associated one TCI state in a cell with the lowest index among at least one cell corresponding to a CORESET associated with a CSS and associated with one TCI state in the second CORESET, where the second CORESET includes the M CORESETs associated with two TCI states and the N CORESETs associated with one TCI state.

It can be understood that, a CORESET associated with a CSS and associated with one TCI state is firstly selected from the second CORESET to obtain at least one CORESET, then a cell corresponding to the at least one CORESET is determined to obtain at least one cell, and a cell with the lowest index is selected from the at least one cell, and finally, a CORESET in the second CORESET that is associated with a CSS with the lowest index and associated with one TCI state is selected from the cell with the lowest index, thereby obtaining the second reference CORESET.

As can be seen, in embodiments of the disclosure, based on rule 2-5 described in this example, in overlapping PDCCH monitoring occasions on an active downlink BWP, it is possible to determine accurately and quickly a CORESET (namely, the second reference CORESET) associated with one TCI state and associated with (corresponding to) a CSS with the lowest index in a cell with the lowest index among cells corresponding to a CORESET associated with a CSS and associated with one TCI state. In this way, the terminal can perform PDCCH monitoring in a CORESET associated with two TCI states or one TCI state, thereby ensuring flexibility, robustness, and stability of system communication.

Rule 2-6:

In a possible example, in overlapping PDCCH monitoring occasions on an active downlink BWP, if N>0 and a second CORESET does not include a CORESET associated with a CSS and associated with one TCI state, the second reference CORESET may be: a CORESET in the second CORESET that is associated with an USS with the lowest index and associated with one TCI state in a cell with the lowest index among at least one cell corresponding to a CORESET associated with an USS and associated with one TCI state in the second CORESET, where the second CORESET includes the M CORESETs associated with two TCI states and the N CORESETs associated with one TCI state.

It can be understood that, a CORESET associated with an USS and associated with one TCI state is firstly selected from the second CORESET to obtain at least one CORESET, then a cell corresponding to the at least one CORESET is determined to obtain at least one cell, and a cell with the lowest index is selected from the at least one cell, and finally, a CORESET in the second CORESET that is associated with an USS with the lowest index and associated with one TCI state is selected from the cell with the lowest index, thereby obtaining the second reference CORESET.

As can be seen, in embodiments of the disclosure, based on rule 2-6 described in this example, it is possible to determine accurately and quickly a CORESET (namely, the second reference CORESET) associated with one TCI state and associated with (corresponding to) an USS with the lowest index in overlapping PDCCH monitoring occasions on an active downlink BWP, so that the terminal can perform PDCCH monitoring in a CORESET associated with two TCI states or one TCI state, thereby ensuring flexibility, robustness, and stability of system communication.

It should be noted that, different from the second reference CORESET in rule 2-1 and rule 2-2, the second reference CORESET in rule 2-5 and rule 2-6 is only a CORESET associated with one TCI state.

Rule 2-z-1 (z=5 or 6)

In a possible example, the second reference CORESET is a CORESET associated with one TCI state, and the first CORESET may include: a CORESET associated with two TCI states and having the same QCL-typeD property as a third reference CORESET among the M CORESETs associated with two TCI states, and/or a CORESET associated with one TCI state and having the same QCL-typeD property as the second reference CORESET among the N CORESETs associated with one TCI state, where the third reference CORESET is a CORESET determined from the M CORESETs associated with the two TCI states according to the QCL-typeD property for the second reference CORESET.

Specifically, one QCL-typeD property for the third reference CORESET is the same as the QCL-typeD property for the second reference CORESET.

It should be noted that, in rule 2-z-1, the first CORESET includes at least one CORESET associated with one TCI state and/or at least one CORESET associated with two TCI states, where a QCL-typeD property for the CORESET associated with one TCI state is the same as the QCL-typeD property for the second reference CORESET, and one QCL-typeD property for the CORESET associated with two TCI states is the same as the QCL-typeD property for the second reference CORESET.

A rule for selecting the third reference CORESET from the M CORESETs associated with two TCI states will be elaborated below in embodiment of the disclosure.

Rule 2-z-1-1

In a possible example, in overlapping PDCCH monitoring occasions on an active downlink BWP, if a third CORESET includes a CORESET associated with a CSS, the third reference CORESET may be: a CORESET that belongs to the third CORESET and is associated with a CSS with the lowest index in a cell with the lowest index among at least one cell corresponding to a CORESET associated with a CSS in the third CORESET, where the third CORESET includes at least one CORESET having the same QCL-typeD property as the second reference CORESET and associated with two TCI states among the M CORESETs associated with two TCI states.

It should be noted that, regarding the third CORESET, it can be understood that, in embodiments of the disclosure, at least one CORESET having the same QCL-typeD property as the second reference CORESET can be selected from the M CORESETs associated with two TCI states to obtain the third CORESET. That is, since the second reference CORESET is a CORESET associated with one TCI state, the third CORESET includes at least one CORESET associated with two TCI states, and a QCL-typeD property corresponding to at least one of the two TCI states is the same as the QCL-typeD property for the second reference CORESET.

As can be seen, in embodiments of the disclosure, based on rule 2-z-1-1 described in this example, in overlapping PDCCH monitoring occasions on an active downlink BWP, it is possible to determine accurately and quickly, a CORESET (namely, the second reference CORESET) associated with one TCI state and associated with (corresponding to) a CSS or USS with the lowest index and a CORESET (namely, the third reference CORESET) associated with two TCI states and associated with (corresponding to) a CSS with the lowest index, so that the terminal can perform PDCCH monitoring in a CORESET associated with one TCI state and/or a CORESET associated with two TCI states, thereby ensuring flexibility, robustness and, stability of system Rule 2-z-1-2

In a possible example, in overlapping PDCCH monitoring occasions on an active downlink BWP, if a third CORESET does not include a CORESET associated with a CSS, the third reference CORESET may be: a CORESET that belongs to the third CORESET and is associated with an USS with the lowest index in a cell with the lowest index among at least one cell corresponding to a CORESET associated with an USS in the third CORESET, where the third CORESET includes at least one CORESET having the same QCL-typeD property as the second reference CORESET and associated with two TCI states among the M CORESETs associated with two TCI states.

It should be noted that, if the third CORESET does not include a CORESET associated with a CSS, a CORESET that belongs to the third CORESET and is associated with an USS with the lowest index in a cell with the lowest index among at least one cell corresponding to a CORESET associated with (corresponding to) an USS in the third CORESET is taken as the third reference CORESET. That is, at least one CORESET having the same QCL-typeD property as the second reference CORESET is firstly selected from the M CORESETs associated with two TCI states to obtain the third CORESET, then a CORESET associated with an USS is selected from the third CORESET to obtain at least one CORESET, a cell corresponding to the at least one CORESET is determined to obtain at least one cell, and a cell with the lowest index is selected from the at least one cell, and finally, a CORESET belonging to the third CORESET and associated with an USS with the lowest index is selected from the cell with the lowest index, thereby obtaining the third reference CORESET.

As can be seen, in embodiments of the disclosure, based on rule 2-z-1-2 described in this example, in overlapping PDCCH monitoring occasions on an active downlink BWP, it is possible to determine accurately and quickly a CORESET (namely, the second reference CORESET) associated with one TCI state and associated with (corresponding to) a CSS or USS with the lowest index and a CORESET (namely, the third reference CORESET) associated with two TCI states and associated with (corresponding to) an USS with the lowest index, so that the terminal can perform PDCCH monitoring in a CORESET associated with one TCI state and/or a CORESET associated with two TCI states, thereby ensuring flexibility, robustness, and stability of system communication.

As can be seen, in embodiments of the disclosure, if the M CORESETs associated with two TCI states and the N CORESETs associated with one TCI state exist in CORESETs associated with PDCCH candidates monitored in overlapping PDCCH monitoring occasions on an active downlink BWP, the terminal can perform PDCCH monitoring in the M CORESETs associated with two TCI states and/or the N CORESETs associated with one TCI state. In this way, it is possible to realize PDCCH monitoring in a CORESET associated with two TCI state and/or a CORESET associated with one TCI state when the terminal supports a CORESET configured with two TCI state, thereby ensuring flexibility, robustness, and stability of system communication.

Figure 3:
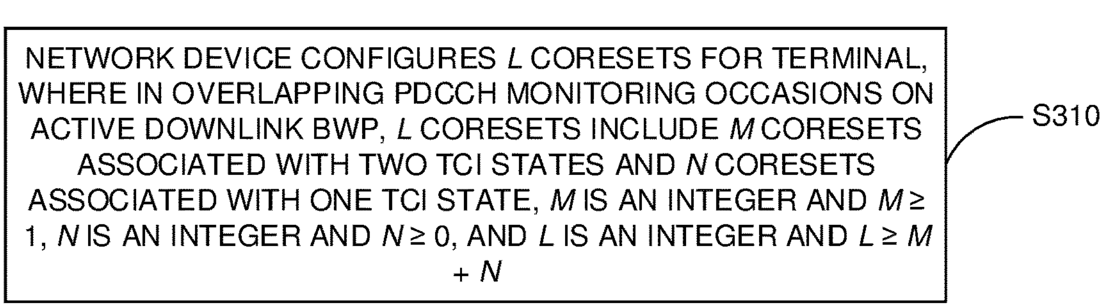
FIG. 3 is a schematic flowchart of another monitoring method provided in embodiments of the disclosure.

Consistent with the foregoing embodiments, embodiments of the disclosure provide a schematic flowchart of another monitoring method. Referring to FIG. 3, the method includes the following.

S310, a network device configures L CORESETs for a terminal, where in overlapping PDCCH monitoring occasions on an active downlink BWP, the L CORESETs include M CORESETs associated with two TCI states and N CORESETs associated with one TCI state, M is an integer and M≥1, N is an integer and N≥0, and L is an integer and L≥M+N.

Specifically, the M CORESETs associated with two TCI states may include a first reference CORESET, where the first reference CORESET may be a CORESET associated with two TCI states.

Specifically, the M CORESETs associated with two TCI states and the N CORESETs associated with two TCI states may include a second reference CORESET and a first CORESET, where the second reference CORESET is a CORESET associated with two TCI states or one TCI state, and the first CORESET is determined according to a QCL-typeD property for the second reference CORESET.

It should be noted that, in embodiments of the disclosure, the elaboration of each embodiment has its own emphasis. Therefore, for the part not described in detail in embodiments illustrated in FIG. 3, reference can be made to the related elaboration of embodiments illustrated in FIG. 2, which will not be described in detail again herein.

As can be seen, in embodiments of the disclosure, in overlapping PDCCH monitoring occasions on an active downlink BWP, the L CORESETs configured by the network device for the terminal include the M CORESETs associated with two TCI states and the N CORESETs associated with one TCI state. As such, the terminal can perform PDCCH monitoring in the M CORESETs associated with two TCI states and/or the N CORESETs associated with one TCI state, which is possible to realize PDCCH monitoring in a CORESET associated with two TCI states and/or a CORESET associated with one TCI state when the terminal supports a CORESET configured with two TCI states, thereby ensuring flexibility, robustness, and stability of system communication.

The solutions of embodiments of the disclosure are mainly described from the perspective of method. It can be understood that, in order to implement the foregoing functions, the terminal or the network device includes a hardware structure and/or a software module corresponding to each function. Those of ordinary skill in the art will appreciate that units and algorithmic operations of various examples described in connection with embodiments herein can be implemented by hardware or by a combination of computer software and hardware. Whether these functions are performed by means of hardware or computer software driving hardware depends on the application and the design constraints of the associated technical solution. Those skilled in the art may use different methods with regard to each particular application to implement the described functionality, but such methods should not be regarded as lying beyond the scope of the disclosure.

In embodiments of the disclosure, division of functional units of the terminal or the network device may be implemented according to the foregoing method examples. For example, each functional unit may be divided to correspond to each function, or two or more functions may be integrated into one processing unit. The integrated unit may be implemented in the form of hardware, or may be implemented in the form of software program module. It should be noted that, the division of units in embodiments of the disclosure is illustrative, and is only a division of logical functions, and other manners of division may be available in practice.

Figure 4:
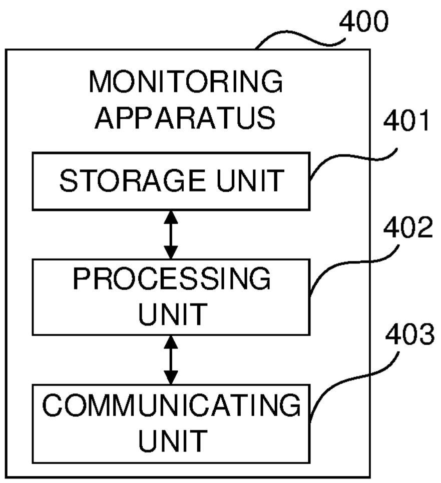
FIG. 4 is a block diagram illustrating functional units of a monitoring apparatus provided in embodiments of the disclosure.

If an integrated unit is adopted, FIG. 4 provides a block diagram illustrating functional units of a monitoring apparatus. The monitoring apparatus 400 includes a processing unit 402 and a communicating unit 403. The processing unit 402 is configured to control and manage actions of a terminal. For example, the processing unit 402 is configured to support the terminal to perform steps in FIG. 2, as well as other procedures in the technical solutions described in the disclosure. The monitoring apparatus 400 may further include a storage unit 401. The storage unit 401 is configured to store program codes executed by the monitoring apparatus 400 and data to be transmitted.

It should be noted that, the monitoring apparatus 400 may be a chip or a chip module.

The processing unit 402 may be a processor or a controller, and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. Various illustrative logic blocks, modules, and circuits described in connection with the disclosure can be implemented or executed. The processing unit 402 may also be a combination for implementing computing functions, for example, a combination that includes one or more microprocessors, a combination of a DSP and a microprocessor, and the like. The communicating unit 403 may be a communication interface, a transceiver, a transceiver circuit, or the like. The storage unit 401 may be a memory. If the processing unit 402 is a processor, the communicating unit 403 is a communication interface, and the storage unit 401 is a memory, the monitoring apparatus 400 involved in embodiments of the disclosure may be a terminal illustrated in FIG. 6.

During implementation, the processing unit 402 is configured to implement any step performed by the terminal in the foregoing method embodiments. When implementing data transmission such as sending, the processing unit 402 may optionally invoke the communicating unit 403 to complete a corresponding operation. Detailed elaboration will be given below.

The processing unit 402 is configured to perform PDCCH monitoring in M CORESETs associated with two TCI states and/or N CORESETs associated with one TCI state, if the M CORESETs associated with two TCI states and the N CORESETs associated with one TCI state exist in CORESETs associated with PDCCH candidates monitored in overlapping PDCCH monitoring occasions on an active downlink BWP, where M is an integer and M≥1, and N is an integer and N≥0.

It should be noted that, for the implementation of each operation in embodiments illustrated in FIG. 4, reference can be made to the elaboration in method embodiments illustrated in FIG. 2, which will not be described in detail again herein.

As can be seen, in embodiments of the disclosure, if the M CORESETs associated with two TCI states and the N CORESETs associated with one TCI state exist in CORESETs associated with PDCCH candidates monitored in overlapping PDCCH monitoring occasions on an active downlink BWP, the apparatus for PDCCH monitoring can perform PDCCH monitoring in the M CORESETs associated with two TCI states and/or the N CORESETs associated with one TCI state. In this way, it is possible to realize PDCCH monitoring in a CORESET associated with two TCI state and/or a CORESET associated with one TCI state when the terminal supports a CORESET configured with two TCI state, thereby ensuring flexibility, robustness, and stability of system communication.

In a possible example, in terms of performing PDCCH monitoring in the M CORESETs associated with two TCI states and/or the N CORESETs associated with one TCI state, the processing unit 302 is specifically configured to: perform PDCCH monitoring in a first reference CORESET and/or a CORESET associated with two TCI states and having the same QCL-typeD property as the first reference CORESET, where the first reference CORESET is one of the M CORESETs associated with two TCI states; or perform PDCCH monitoring in a second reference CORESET and/or a first CORESET, where the second reference CORESET is one of the M CORESETs associated with two TCI states and the N CORESETs associated with one TCI state, and the first CORESET is determined according to a QCL-typeD property for the second reference CORESET.

In a possible example, in the overlapping PDCCH monitoring occasions on the active downlink BWP, if a first cell set has a cell corresponding to a CORESET associated with two TCI states and associated with a CSS, the first reference CORESET is: a CORESET that is associated with two TCI states and associated with a CSS with the lowest index in a cell with the lowest index among at least one cell corresponding to a CORESET associated with two TCI states and associated with a CSS in the first cell set, where the first cell set includes cells corresponding to the M CORESETs associated with two TCI states and cells corresponding to the N CORESETs associated with one TCI state.

In a possible example, in the overlapping PDCCH monitoring occasions on the active downlink BWP, if a first cell set does not have a cell corresponding to a CORESET associated with two TCI states and associated with a CSS, the first reference CORESET is: a CORESET that is associated with two TCI states and associated with an USS with the lowest index in a cell with the lowest index among at least one cell corresponding to a CORESET associated with two TCI states and associated with an USS in the first cell set.

In a possible example, in the overlapping PDCCH monitoring occasions on the active downlink BWP, if a first cell set has a cell corresponding to a CORESET associated with a CSS, the second reference CORESET is: a CORESET associated with a CSS with the lowest index in a cell with the lowest index among cells corresponding to a CORESET associated with a CSS in the first cell set.

In a possible example, in the overlapping PDCCH monitoring occasions on the active downlink BWP, if a first cell set does not have a cell corresponding to a CORESET associated with a CSS, the second reference CORESET is: a CORESET associated with an USS with the lowest index in a cell with the lowest index among cells corresponding to a CORESET associated with an USS in the first cell set.

In a possible example, if the second reference CORESET is a CORESET associated with one TCI state, the first CORESET includes: at least one CORESET associated with two TCI states and having the same QCL-typeD property as the second reference CORESET among the M CORESETs associated with two TCI states, and/or at least one CORESET associated with one TCI state and having the same QCL-typeD property as the second reference CORESET among the N CORESETs associated with one TCI state.

In a possible example, if the second reference CORESET is a CORESET associated with one TCI state, the first CORESET includes: a CORESET associated with two TCI states and having the same QCL-typeD property as the second reference CORESET among the M CORESETs associated with two TCI states, where QCL-typeD properties corresponding to the two TCI states for the CORESET associated with two TCI states are the same; and/or a CORESET associated with one TCI state and having the same QCL-typeD property as the second reference CORESET among the N CORESETs associated with one TCI state.

In a possible example, if the second reference CORESET is a CORESET associated with one TCI state, the first CORESET includes: a CORESET associated with two TCI states and having the same QCL-typeD property as a third reference CORESET among the M CORESETs associated with two TCI states, and/or a CORESET associated with one TCI state and having the same QCL-typeD property as the second reference CORESET among the N CORESETs associated with one TCI state, where the third reference CORESET is a CORESET determined from the M CORESETs associated with two TCI states according to the QCL-typeD property for the second reference CORESET.

In a possible example, in the overlapping PDCCH monitoring occasions on the active downlink BWP, if a third CORESET includes a CORESET associated with a CSS, the third reference CORESET is: a CORESET that belongs to the third CORESET and is associated with a CSS with the lowest index in a cell with the lowest index among at least one cell corresponding to a CORESET associated with a CSS in the third CORESET, where the third CORESET includes: at least one CORESET having the same QCL-typeD property as the second reference CORESET and associated with two TCI states among the M CORESETs associated with two TCI states.

In a possible example, in the overlapping PDCCH monitoring occasions on the active downlink BWP, if a third CORESET does not include a CORESET associated with a CSS, the third reference CORESET is: a CORESET that belongs to the third CORESET and is associated with an USS with the lowest index in a cell with the lowest index among at least one cell corresponding to a CORESET associated with an USS in the third CORESET, where the third CORESET includes: at least one CORESET having the same QCL-typeD property as the second reference CORESET and associated with two TCI states among the M CORESETs associated with two TCI states.

In a possible example, if the second reference CORESET is a CORESET associated with two TCI states, the first CORESET includes: a CORESET associated with two TCI states and having the same QCL-typeD property as the second reference CORESET among the M CORESETs associated with two TCI states, and/or a CORESET associated with one TCI state and having the same QCL-typeD property as at least one QCL-typeD property for the second reference CORESET among the N CORESETs associated with one TCI state.

Figure 5:
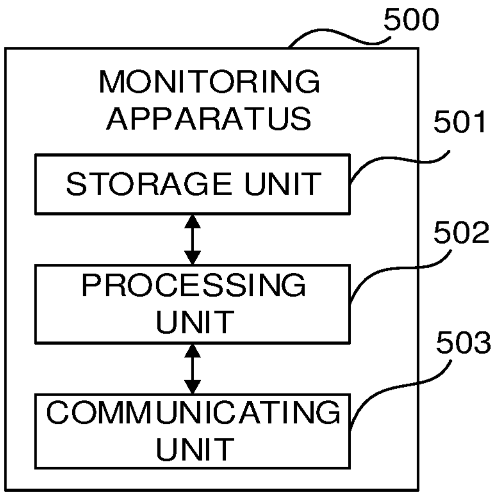
FIG. 5 is a block diagram illustrating functional units of another monitoring apparatus provided in embodiments of the disclosure.

If an integrated unit is adopted, FIG. 5 provides a block diagram illustrating functional units of another monitoring apparatus. The monitoring apparatus 500 includes a processing unit 502 and a communicating unit 503. The processing unit 502 is configured to control and manage actions of a network device. For example, the processing unit 502 is configured to support the network device to perform steps in FIG. 3, as well as other procedures in the technical solutions described in the disclosure. The communicating unit 503 is configured to support communication between the network device and other devices in a wireless communication system. The monitoring apparatus 500 may further include a storage unit 501. The storage unit 501 is configured to store program codes executed by the monitoring apparatus 500 and data to be transmitted.

It should be noted that, the monitoring apparatus 500 may be a chip or a chip module.

The processing unit 502 may be a processor or a controller, and may be, for example, a CPU, a general-purpose processor, a DSP, an ASIC, a FPGA, or other programmable logic devices, transistor logic devices, hardware components, or any combination thereof. Various illustrative logic blocks, modules, and circuits described in connection with the disclosure can be implemented or executed. The processing unit 502 may also be a combination for implementing computing functions, for example, a combination that includes one or more microprocessors, a combination of a DSP and a microprocessor, and the like. The communicating unit 503 may be a communication interface, a transceiver, a transceiver circuit, or the like, and the storage unit 501 may be a memory. If the processing unit 502 is a processor, the communicating unit 503 is a communication interface, and the storage unit 501 is a memory, the monitoring apparatus 500 involved in embodiments of the disclosure may be a network device illustrated in FIG. 7.

During implementation, the processing unit 502 is configured to implement any step performed by the network device in the foregoing method embodiments. When implementing data transmission such as sending, the processing unit 502 may optionally invoke the communicating unit 503 to complete a corresponding operation. Detailed elaboration will be given below.

The processing unit 502 is configured to: configure L CORESETs for a terminal, where in overlapping PDCCH monitoring occasions on an active downlink BWP, the L CORESETs include M CORESETs associated with two TCI states and N CORESETs associated with one TCI state, M is an integer and M≥1, N is an integer and N≥0, and Lis an integer and L≥M+N.

It should be noted that, for the implementation of each operation in embodiments illustrated in FIG. 5, reference can be made to the elaboration in method embodiments illustrated in FIG. 2 and FIG. 3, which will not be elaborated again herein.

As can be seen, in embodiments of the disclosure, in overlapping PDCCH monitoring occasions on an active downlink BWP, the L CORESETs configured for the terminal include the M CORESETs associated with two TCI states and the N CORESETs associated with one TCI state. As such, the terminal can perform PDCCH monitoring in the M CORESETs associated with two TCI states and/or the N CORESETs associated with one TCI state, which is possible to realize PDCCH monitoring in a CORESET associated with two TCI states and/or a CORESET associated with one TCI state when the terminal supports a CORESET configured with two TCI states, thereby ensuring flexibility, robustness, and stability of system communication.

In a possible example, the M CORESETs associated with two TCI states include a first reference CORESET, where the first reference CORESET is a CORESET associated with two TCI states; or the M CORESETs associated with two TCI states and the N CORESETs associated with two TCI states include a second reference CORESET and a first CORESET, where the the second reference CORESET is a CORESET associated with two TCI states or one TCI state, and the first CORESET is determined according to a QCL-typeD property for the second reference CORESET.

In a possible example, in the overlapping PDCCH monitoring occasions on the active downlink BWP, if a first cell set has a cell corresponding to a CORESET associated with two TCI states and associated with a CSS, the first reference CORESET is: a CORESET that is associated with two TCI states and associated with a CSS with the lowest index in a cell with the lowest index among at least one cell corresponding to a CORESET associated with two TCI states and associated with a CSS in the first cell set, where the first cell set includes cells corresponding to the M CORESETs associated with two TCI states and cells corresponding to the N CORESETs associated with one TCI state.

In a possible example, in the overlapping PDCCH monitoring occasions on the active downlink BWP, if a first cell set does not have a cell corresponding to a CORESET associated with two TCI states and associated with a CSS, the first reference CORESET is: a CORESET that is associated with two TCI states and associated with an USS with the lowest index in a cell with the lowest index among at least one cell corresponding to a CORESET associated with two TCI states and associated with an USS in the first cell set.

In a possible example, in the overlapping PDCCH monitoring occasions on the active downlink BWP, if a first cell set has a cell corresponding to a CORESET associated with a CSS, the second reference CORESET is: a CORESET associated with a CSS with the lowest index in a cell with the lowest index among cells corresponding to a CORESET associated with a CSS in the first cell set.

In a possible example, in the overlapping PDCCH monitoring occasions on the active downlink BWP, if a first cell set does not have a cell corresponding to a CORESET associated with a CSS, the second reference CORESET is: a CORESET associated with an USS with the lowest index in a cell with the lowest index among cells corresponding to a CORESET associated with an USS in the first cell set.

In a possible example, if the second reference CORESET is a CORESET associated with one TCI state, the first CORESET includes: at least one CORESET associated with two TCI states and having the same QCL-typeD property as the second reference CORESET among the M CORESETs associated with two TCI states, and/or at least one CORESET associated with one TCI state and having the same QCL-typeD property as the second reference CORESET among the N CORESETs associated with one TCI state.

In a possible example, if the second reference CORESET is a CORESET associated with one TCI state, the first CORESET includes: a CORESET associated with two TCI states and having the same QCL-typeD property as the second reference CORESET among the M CORESETs associated with two TCI states, where QCL-typeD properties corresponding to the two TCI states for the CORESET associated with two TCI states are the same; and/or a CORESET associated with one TCI state and having the same QCL-typeD property as the second reference CORESET among the N CORESETs associated with one TCI state.

In a possible example, if the second reference CORESET is a CORESET associated with one TCI state, the first CORESET includes: a CORESET associated with two TCI states and having the same QCL-typeD property as a third reference CORESET among the M CORESETs associated with two TCI states, and/or a CORESET associated with one TCI state and having the same QCL-typeD property as the second reference CORESET among the N CORESETs associated with one TCI state, where the third reference CORESET is a CORESET determined from the M CORESETs associated with two TCI states according to the QCL-typeD property for the second reference CORESET.

In a possible example, in the overlapping PDCCH monitoring occasions on the active downlink BWP, if a third CORESET includes a CORESET associated with a CSS, the third reference CORESET is: a CORESET that belongs to the third CORESET and is associated with a CSS with the lowest index in a cell with the lowest index among at least one cell corresponding to a CORESET associated with a CSS in the third CORESET, where the third CORESET includes: at least one CORESET having the same QCL-typeD property as the second reference CORESET and associated with two TCI states among the M CORESETs associated with two TCI states.

In a possible example, in the overlapping PDCCH monitoring occasions on the active downlink BWP, if a third CORESET does not include a CORESET associated with a CSS, the third reference CORESET is: a CORESET that belongs to the third CORESET and is associated with an USS with the lowest index in a cell with the lowest index among at least one cell corresponding to a CORESET associated with an USS in the third CORESET, where the third CORESET includes: at least one CORESET having the same QCL-typeD property as the second reference CORESET and associated with two TCI states among the M CORESETs associated with two TCI states.

In a possible example, if the second reference CORESET is a CORESET associated with two TCI states, the first CORESET includes: a CORESET associated with two TCI states and having the same QCL-typeD property as the second reference CORESET among the M CORESETs associated with two TCI states, and/or a CORESET associated with one TCI state and having the same QCL-typeD property as at least one QCL-typeD property for the second reference CORESET among the N CORESETs associated with one TCI state.

Figure 6:
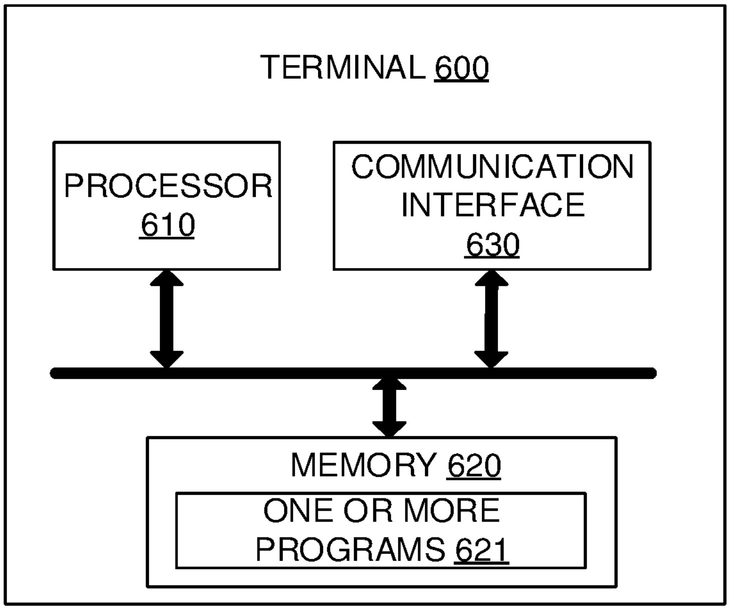
FIG. 6 is a schematic structural diagram of a terminal provided in embodiments of the disclosure.

Referring to FIG. 6, FIG. 6 is a schematic structural diagram of a terminal provided in embodiments of the disclosure. The terminal 600 includes a processor 610, a memory 620, a communication interface 630, and a communication bus. The communication bus is configured to couple the processor 610, the memory 620, and the communication interface 630.

The memory 620 includes, but is not limited to, a random access memory (RAM), a read-only memory (ROM), an erasable programmable ROM (EPROM), or a compact disc ROM (CD-ROM). The memory 620 is configured to store program codes executed by the terminal 600 and data to be transferred.

The communication interface 630 is configured to receive and transmit data.

The processor 610 may be one or more CPUs. If the processor 610 is one CPU, the CPU may be a single-core CPU or a multi-core CPU.

The processor 610 in the terminal 600 is configured to read one or more programs 621 stored in the memory 620, to perform the following operations: perform PDCCH monitoring in M CORESETs associated with two TCI states and/or N CORESETs associated with one TCI state, if the M CORESETs associated with two TCI states and the N CORESETs associated with one TCI state exist in CORESETs associated with PDCCH candidates monitored in overlapping PDCCH monitoring occasions on an active downlink BWP, where M is an integer and $M \geq 1$, and N is an integer and $N \geq 0$.

It should be noted that, for the implementation of each operation, reference can be made to the corresponding elaboration in method embodiments illustrated in FIG. 2, and the terminal 600 can be configured to implement the method at a terminal side in the foregoing method embodiments of the disclosure, which will not be described in detail again herein.

As can be seen, if the M CORESETs associated with two TCI states and the N CORESETs associated with one TCI state exist in CORESETs associated with PDCCH candidates monitored in overlapping PDCCH monitoring occasions on an active downlink BWP, the terminal can perform PDCCH monitoring in the M CORESETs associated with two TCI states and/or the N CORESETs associated with one TCI state. In this way, it is possible to realize PDCCH monitoring in a CORESET associated with two TCI state and/or a CORESET associated with one TCI state when the terminal supports a CORESET configured with two TCI state, thereby ensuring flexibility, robustness, and stability of system communication.

Figure 7:
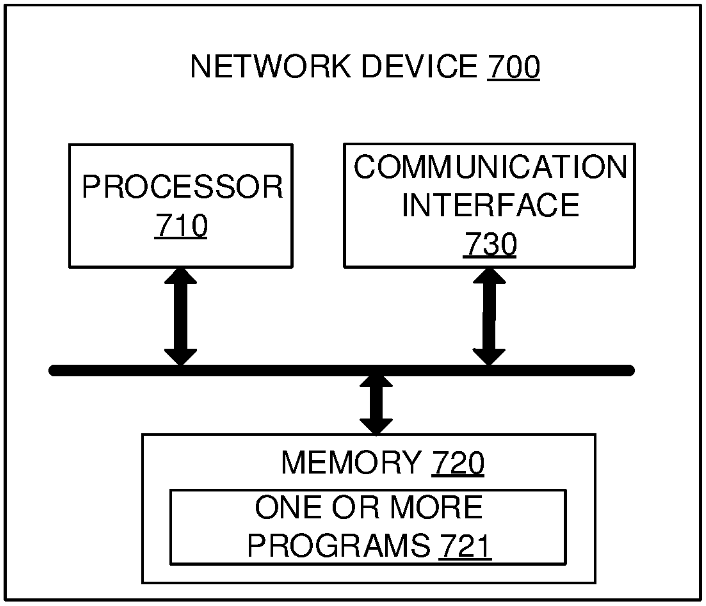
FIG. 7 is a schematic structural diagram of a network device provided in embodiments of the disclosure.

Referring to FIG. 7, FIG. 7 is a schematic structural diagram of a network device provided in embodiments of the disclosure. The network device 700 includes a processor 710, a memory 720, a communication interface 730, and a communication bus. The communication bus is configured to couple the processor 710, the memory 720, and the communication interface 730.

The memory 720 includes, but is not limited to, a RAM, a ROM, an EPROM, or a CD-ROM. The memory 720 is configured to store program codes executed by the network device 700 and data to be transmitted.

The communication interface 730 is configured to receive and transmit data.

The processor 710 may be one or more CPUs. If the processor 710 is one CPU, the CPU may be a single-core CPU or a multi-core CPU.

The processor 710 in the network device 700 is configured to read one or more programs 721 stored in the memory 720, to implement following operations: configure L CORESETs for a terminal, where in overlapping PDCCH monitoring occasions on an active downlink BWP, the L CORESETs include M CORESETs associated with two TCI states and N CORESETs associated with one TCI state, M is an integer and $M \geq 1$, N is an integer and $N \geq 0$, and L is an integer and $L \geq M+N$.

It should be noted that, for the implementation of each operation, reference an be made to corresponding elaboration in method embodiments illustrated in FIG. 2 and FIG. 3, and the network device 700 can be configured to perform the method at a network-device side in the foregoing method embodiments of the disclosure, which will not be described in detail again herein.

As can be seen, in overlapping PDCCH monitoring occasions on an active downlink BWP, the L CORESETs configured for the terminal by the network device include the M CORESETs associated with two TCI states and the N CORESETs associated with one TCI state. As such, the terminal can perform PDCCH monitoring in the M CORESETs associated with two TCI states and/or the N CORESETs associated with one TCI state, which is possible to realize PDCCH monitoring in a CORESET associated with two TCI states and/or a CORESET associated with one TCI state when the terminal supports a CORESET configured with two TCI states, thereby ensuring flexibility, robustness, and stability of system communication.

Embodiments of the disclosure further provide a computer-readable storage medium. The computer-readable storage medium is configured to store computer programs for electronic data interchange (EDI). The computer programs are operable with a computer to implement some or all of the steps of the terminal or the network device in the foregoing method embodiments.

Embodiments of the disclosure further provide a computer program product. The computer program product includes computer programs. The computer programs are operable with a computer to implement some or all of the steps of the terminal or the network device in the foregoing method embodiments. The computer program product may be a software installation package.

In the foregoing embodiments, the illustration of each embodiment has its own emphasis in embodiments of the disclosure. For the parts not described in detail in one embodiment, reference can be made to related illustrations in other embodiments.

The steps of the method or algorithm described in embodiments of the disclosure may be implemented by means of hardware, or may be implemented by means of software instructions executed by a processor. The software instructions may consist of respective software modules. The software module may be stored in a RAM, a flash memory, a ROM, an EPROM, an electrically EPROM, a register, a hard disk, a mobile disk, a CD-ROM, or any other form of storage medium known in the art. An exemplary storage medium is coupled to the processor such that the processor can read information from and write information to the storage medium. The storage medium may also be a part of the processor, and the processor and the storage medium may be located in an ASIC. In addition, the ASIC may be located in a terminal or a management device. The processor and the storage medium may also exist in the terminal or the management device as discrete components.

Those skilled in the art should appreciate that in one or more of the foregoing examples, all or some of the functions descried in embodiments of the disclosure can be implemented through software, hardware, firmware, or any other combination thereof. When implemented by software, all or some of the functions can be implemented in the form of a computer program product. The computer program product includes one or more computer instructions. When the computer instructions are applied and executed on a computer, all or some of the operations or functions of the embodiments of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Each module/unit in various devices and products described in the foregoing embodiments may be a software module/unit or a hardware module/unit, or may be a combination of a software module/unit and a hardware module/unit. For example, with regard to various devices and products applied to or integrated into a chip, various modules/units contained therein may all be realized by means of hardware such as a circuit; or at least some of the modules/units may be realized by means of a software program run on a processor integrated in the chip, and the rest (if any) modules/units may be implemented by means of hardware such as a circuit. With regard to various devices and products applied to or integrated into a chip module, various modules/units therein may all be implemented by means of hardware such as a circuit, different modules/units may be located in the same component (e.g., chip, circuit module, etc.) module or in different components of a chip; alternatively, at least some of the modules/units may be implemented by means of a software program run on a processor integrated into the chip module, and the rest (if any) of the modules/units may be implemented by hardware such as a circuit. With regard to various devices and products applied to or integrated into a terminal, various modules/units therein may all be implemented by means of hardware such as a circuit, different modules/units may be located in the same component (for example, chip, circuit module, etc.) or different components in the terminal; alternatively, at least some of the modules/units may be implemented by means a software program run on a processor integrated in the terminal, and the rest (if any) of the modules/units may be implemented by hardware such as a circuit.

The objectives, technical solutions, and advantages of embodiments of the disclosure are described in detail in the foregoing implementations. It should be understood that, the foregoing elaborations are merely implementations of the embodiments of the disclosure, but are not intended to limit the protection scope of the embodiments of the disclosure. Any modifications, equivalent replacements, improvements and the like made based on the technical solutions of the embodiments of the disclosure shall all fall within the protection scope of the embodiments of the disclosure.

What is claimed is:

1. A monitoring method, comprising:

when M control resource sets (CORESETs) associated with two transmission configuration indication (TCI) states and N CORESETs associated with one TCI state exist in CORESETs associated with PDCCH candidates monitored in overlapping PDCCH monitoring occasions on an active downlink bandwidth part (BWP), performing physical downlink control channel (PDCCH) monitoring in a second reference CORESET and a first CORESET, wherein Mis an integer and M≥1, and Nis an integer and N≥0;

wherein, when a first cell set has a cell comprising a CORESET associated with a common search space (CSS), the second reference CORESET is: a CORESET associated with a CSS with a lowest index in a cell with a lowest index among cells comprising a CORESET associated with a CSS in the first cell set;

when the first cell set does not have a cell comprising a CORESET associated with a CSS, the second reference CORESET is: a CORESET associated with a user equipment-specific search space (USS) with a lowest index in a cell with a lowest index among cells comprising a CORESET associated with a USS in the first cell set;

the first cell set comprises cells corresponding to the M CORESETs associated with two TCI states and cells corresponding to the N CORESETs associated with one TCI state;

when the second reference CORESET is a CORESET associated with one TCI state, the first CORESET comprises: at least one CORESET, if any, among the M CORESETs associated with two TCI states and the N CORESETs associated with one TCI state, having a same quasi-co-location (QCL)-typeD property as the second reference CORESET and being associated with one and/or two TCI states.

2. The method of claim 1, wherein when the second reference CORESET is a CORESET associated with one TCI state, the first CORESET comprises:

a CORESET, if any, among the M CORESETs associated with two TCI states and the N CORESETs associated with one TCI state, that has the same QCL-typeD property as the second reference CORESET and is associated with one TCI state and/or associated with two TCI states, and wherein QCL-typeD properties respectively corresponding to the two TCI states for the CORESET associated with two TCI states are the same.

3. The method of claim 1, wherein when the second reference CORESET is a CORESET associated with one TCI state, the first CORESET comprises:

a CORESET, if any, among the M CORESETs associated with two TCI states and the N CORESETs associated with one TCI state, that has the same QCL-typeD property as the second reference CORESET and is associated with one TCI state, and/or a CORESET, if any, that has the same QCL-typeD property as a third reference CORESET and is associated with two TCI states, wherein the third reference CORESET is a CORESET determined from the M CORESETs associated with two TCI states according to the QCL-typeD property for the second reference CORESET.

4. The method of claim 3, wherein in the overlapping PDCCH monitoring occasions on the active downlink BWP, when a third CORESET comprises a CORESET associated with a CSS, the third reference CORESET is:

a CORESET that belongs to the third CORESET and is associated with a CSS with the lowest index in a cell with the lowest index among at least one cell corresponding to a CORESET associated with a CSS in the third CORESET, wherein the third CORESET comprises: at least one CORESET, if any, among the M CORESETs associated with two TCI states, having the same QCL-typeD property as the second reference CORESET and associated with two TCI states.

5. The method of claim 3, wherein in the overlapping PDCCH monitoring occasions on the active downlink BWP, when a third CORESET does not comprise a CORESET associated with a CSS, the third reference CORESET is:

a CORESET that belongs to the third CORESET and is associated with an USS with the lowest index in a cell with the lowest index among at least one cell corresponding to a CORESET associated with an USS in the third CORESET, wherein the third CORESET comprises: at least one CORESET, if any, among the M CORESETs associated with two TCI states, having the same QCL-typeD property as the second reference CORESET and associated with two TCI states.

6. The method of claim 1, wherein when the second reference CORESET is a CORESET associated with two TCI states, the first CORESET comprises:

a CORESET, if any, among the M CORESETs associated with two TCI states and the N CORESETs associated with one TCI state, that is associated with two TCI states and has the same QCL-typeD property as the second reference CORESET, and/or a CORESET, if any, that is associated with one TCI state and has the same QCL-typeD property as at least one QCL-typeD property of the second reference CORESET.

7. A terminal, comprising:

a processor, a memory, a communication interface, and one or more programs, wherein the one or more programs are stored in the memory and configured to be executed by the processor, and the programs comprise instructions for:

when M control resource sets (CORESETs) associated with two transmission configuration indication (TCI) states and N CORESETs associated with one TCI state exist in CORESETs associated with PDCCH candidates monitored in overlapping PDCCH monitoring occasions on an active downlink bandwidth part (BWP), performing physical downlink control channel (PDCCH) monitoring in a second reference CORESET and a first CORESET, wherein M is an integer and M≥1, and N is an integer and N≥0;

wherein, when a first cell set has a cell comprising a CORESET associated with a common search space (CSS), the second reference CORESET is: a CORESET associated with a CSS with a lowest index in a cell with a lowest index among cells comprising a CORESET associated with a CSS in the first cell set;

when the first cell set does not have a cell comprising a CORESET associated with a CSS, the second reference CORESET is: a CORESET associated with a user equipment-specific search space (USS) with a lowest index in a cell with a lowest index among cells comprising a CORESET associated with a USS in the first cell set;

the first cell set comprises cells corresponding to the M CORESETs associated with two TCI states and cells corresponding to the N CORESETs associated with one TCI state;

when the second reference CORESET is a CORESET associated with one TCI state, the first CORESET comprises: at least one CORESET, if any, among the M CORESETs associated with two TCI states and the N CORESETs associated with one TCI state, having a same quasi-co-location (QCL)-typeD property as the second reference CORESET and being associated with one and/or two TCI states.

8. The terminal of claim 7, wherein when the second reference CORESET is a CORESET associated with one TCI state, the first CORESET comprises:

a CORESET, if any, among the M CORESETs associated with two TCI states and the N CORESETs associated with one TCI state, that has the same QCL-typeD property as the second reference CORESET and is associated with one TCI state and/or associated with two TCI states, and wherein QCL-typeD properties respectively corresponding to the two TCI states for the CORESET associated with two TCI states are the same.

9. The terminal of claim 7, wherein when the second reference CORESET is a CORESET associated with one TCI state, the first CORESET comprises:

a CORESET, if any, among the M CORESETs associated with two TCI states and the N CORESETs associated with one TCI state, that has the same QCL-typeD property as the second reference CORESET and is associated with one TCI state, and/or a CORESET, if any, that has the same QCL-typeD property as a third reference CORESET and is associated with two TCI states, wherein the third reference CORESET is a CORESET determined from the M CORESETs associated with two TCI states according to the QCL-typeD property for the second reference CORESET.

10. The terminal of claim 9, wherein in the overlapping PDCCH monitoring occasions on the active downlink BWP, when a third CORESET comprises a CORESET associated with a CSS, the third reference CORESET is:

a CORESET that belongs to the third CORESET and is associated with a CSS with the lowest index in a cell with the lowest index among at least one cell corresponding to a CORESET associated with a CSS in the third CORESET, wherein the third CORESET comprises: at least one CORESET, if any, among the M CORESETs associated with two TCI states, having the same QCL-typeD property as the second reference CORESET and associated with two TCI states.

11. The terminal of claim 9, wherein in the overlapping PDCCH monitoring occasions on the active downlink BWP, when a third CORESET does not comprise a CORESET associated with a CSS, the third reference CORESET is:

a CORESET that belongs to the third CORESET and is associated with a USS with the lowest index in a cell with the lowest index among at least one cell corresponding to a CORESET associated with a USS in the third CORESET, wherein the third CORESET comprises: at least one CORESET, if any, among the M CORESETs associated with two TCI states, having the same QCL-typeD property as the second reference CORESET and associated with two TCI states.

12. The terminal of claim 7, wherein when the second reference CORESET is a CORESET associated with two TCI states, the first CORESET comprises:

a CORESET, if any, among the M CORESETs associated with two TCI states and the N CORESETs associated with one TCI state, that is associated with two TCI states and has the same QCL-typeD property as the second reference CORESET, and/or a CORESET, if any, that is associated with one TCI state and has the same QCL-typeD property as at least one QCL-typeD property of the second reference CORESET.

13. A non-transitory computer-readable storage medium configured to store computer programs for electronic data interchange (EDI), wherein the computer programs are operable with a computer to:

when M control resource sets (CORESETs) associated with two transmission configuration indication (TCI) states and N CORESETs associated with one TCI state exist in CORESETs associated with PDCCH candidates monitored in overlapping PDCCH monitoring occasions on an active downlink bandwidth part (BWP), perform physical downlink control channel (PDCCH) monitoring in a second reference CORESET and a first CORESET, wherein M is an integer and M≥1, and N is an integer and N≥0;

wherein, when a first cell set has a cell comprising a CORESET associated with a common search space (CSS), the second reference CORESET is: a CORESET associated with a CSS with a lowest index in a cell with a lowest index among cells comprising a CORESET associated with a CSS in the first cell set;

when the first cell set does not have a cell comprising a CORESET associated with a CSS, the second reference CORESET is: a CORESET associated with a user equipment-specific search space (USS) with a lowest index in a cell with a lowest index among cells comprising a CORESET associated with a USS in the first cell set;

the first cell set comprises cells corresponding to the M CORESETs associated with two TCI states and cells corresponding to the N CORESETs associated with one TCI state;

when the second reference CORESET is a CORESET associated with one TCI state, the first CORESET comprises: at least one CORESET, if any, among the M CORESETs associated with two TCI states and the N CORESETs associated with one TCI state, having a same quasi-co-location (QCL)-typeD property as the second reference CORESET and being associated with one and/or two TCI states.

* * * * *